United States Patent
Tie et al.

(10) Patent No.: US 11,962,387 B2
(45) Date of Patent: Apr. 16, 2024

(54) WIRELESS COMMUNICATION METHOD AND APPARATUS

(71) Applicant: HUAWEI TECHNOLOGIES CO., LTD., Shenzhen (CN)

(72) Inventors: Xiaolei Tie, Shanghai (CN); Han Zhou, Shanghai (CN); Lixia Xue, Beijing (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 17/591,120

(22) Filed: Feb. 2, 2022

(65) Prior Publication Data
US 2022/0158716 A1 May 19, 2022

Related U.S. Application Data

(63) Continuation of application No. PCT/CN2020/107063, filed on Aug. 5, 2020.

(30) Foreign Application Priority Data

Aug. 5, 2019 (CN) .......................... 201910718559.0

(51) Int. Cl.
*H04B 7/02* (2018.01)
*H04B 7/0426* (2017.01)
(Continued)

(52) U.S. Cl.
CPC ......... *H04B 7/0857* (2013.01); *H04B 7/0426* (2013.01); *H04W 72/044* (2013.01); *H04W 72/23* (2023.01)

(58) Field of Classification Search
CPC . H04B 7/0857; H04B 7/0426; H04W 72/044; H04W 72/23
(Continued)

(56) References Cited

U.S. PATENT DOCUMENTS 11,438,948 B1 * 9/2022 Oroskar ............... H04B 7/0413
2019/0159049 A1 * 5/2019 Kim ..................... H04B 7/0417

FOREIGN PATENT DOCUMENTS

CN 106559201 A 4/2017
WO 2018084971 A1 5/2018

OTHER PUBLICATIONS

CMCC: "Discussion on power saving signal triggering UE adaptation", 3GPP Draft; R1-1904738, 3rd Generation Partnership-project (3GPP), Mobile Competence Centre ; 650, Route Deslucioles ; F-06921 Sophia-Antipolis Cedex ; France, vol. RAN WG1, No. Xi'an, China; Apr. 8, 2019-Apr. 12, 2019; Apr. 2, 2019 (Apr. 2, 2019), XP051707299, Retrieved from the Internet: URL:http://www.3gpp.org/ftp/tsg%5Fran/WG 1 %5FRL 1 /TSG R 1 %5F96b/Docs/R1%2O1904738%2Ezip[retrieved on Apr. 2, 2019]; 8 total pages.

(Continued)

*Primary Examiner* — Zewdu A Kassa
(74) *Attorney, Agent, or Firm* — Rimon PC

(57) ABSTRACT

This application provides a wireless communication method and an apparatus. In the method, a terminal device receives first indication information from a network device. The first indication information indicates a first maximum multiple-input multiple-output (MIMO) layer quantity N to be used by the terminal device when the terminal device performs wireless communication, where N is an integer greater than or equal to 1. The method further includes that the terminal device performs wireless communication with the network device based on the first maximum MIMO layer quantity N, so that the maximum MIMO layer quantity that the terminal device should use can be adjusted as required.

14 Claims, 9 Drawing Sheets

(51) Int. Cl.
*H04B 7/08* (2006.01)
*H04W 72/044* (2023.01)
*H04W 72/23* (2023.01)

(58) Field of Classification Search
USPC ............... 375/267, 260, 259, 219, 295, 316
See application file for complete search history.

(56) References Cited

OTHER PUBLICATIONS

RP-192569, ZTE et al., Discussion on UE power saving for Rel-17, 3GPP TSG RAN Meeting #86, Sitges, Spain, Dec. 9-12, 2019, total 5 pages.
R1-1904739, CMCC, Discussion on dynamic adaption of power saving states, 3GPP TSG RAN WG1 #96bis, Xi an, China, Apr. 8-12, 2019, total 3 pages.
R1-1906980, Samsung, PDCCH-based power saving signal/channel, 3GPP TSG RAN WG1 #97, Reno, USA, May 13-17, 2019, 12 pages.
R1-1904120, vivo, UE assistant information, 3GPP TSG RAN WG1 #96bis, Xi an, China, Apr. 8-12, 2019, 3 pages.

* cited by examiner

WIRELESS COMMUNICATION METHOD AND APPARATUS

CROSS-REFERENCE TO RELATED APPLICATIONS

This application is a continuation of International Application No. PCT/CN2020/107063, filed on Aug. 5, 2020, which claims priority to Chinese Patent Application No. 201910718559.0, filed on Aug. 5, 2019. The disclosures of the aforementioned applications are hereby incorporated by reference in their entireties.

TECHNICAL FIELD

Embodiments of this application relate to the communication field, and more specifically, to a wireless communication method and an apparatus.

BACKGROUND

In an existing multiple-input multiple-output (MIMO) technology, the quantity of antennas used by a terminal device in a communication process is affected by the maximum MIMO layer quantity used by the terminal device.

In addition, in a conventional technology, the maximum MIMO layer quantity used by the terminal device is indicated by the configuration information related to a bandwidth part (BWP). For example, each BWP corresponds to one maximum MIMO layer quantity. When the BWP is changed, the maximum MIMO layer quantity is also changed.

Therefore, when a currently used BWP corresponds to a relatively large maximum MIMO layer quantity, the terminal device may need to use antennas whose quantity is not less than the maximum MIMO layer quantity to receive or send signals, to ensure that when a network device schedules data of the maximum MIMO layer quantity, the terminal device has the capacity to receive and send signals of the maximum MIMO layer quantity. Even during a period of time when a maximum MIMO layer quantity that the terminal device currently needs to use is relatively small, for example, when a data traffic volume is not high, because the maximum MIMO layer quantity and the BWP are configured in a binding manner, if the BWP is not adjusted, the terminal still needs to prepare to receive or send data scheduled by the network device using the maximum MIMO layer quantity. In this case, power consumption of the terminal device is higher than what is actually needed.

For example, if a configuration in which the maximum MIMO layer quantity is 4 is used for transmitting a data channel, to receive data that may be scheduled by the network device and that is of the maximum MIMO layer quantity, the terminal device needs to use at least four antennas. When scheduling is not performed during a period of time, more power consumption of the terminal device can be reduced when the terminal device sends or receives a control channel by using fewer antennas. However, because the terminal device is not sure when the network device schedules the data of the maximum MIMO layer quantity, and once the data of the maximum MIMO layer quantity is scheduled, a minimum scheduling delay between a physical downlink shared channel (PDSCH) and a physical downlink control channel (PDCCH) that correspond to the data of the maximum MIMO layer quantity may not satisfy a delay requirement of antenna switching of the terminal device. In this case, because a maximum MIMO layer quantity is bound to a configuration of a BWP, the maximum MIMO layer quantity is not updated when a same BWP is used. Therefore, the terminal device always uses the number of antennas that is not less than the maximum MIMO layer quantity to send or receive the control channel. This increases power consumption.

SUMMARY

This application provides a wireless communication method and an apparatus, to reduce power consumption of a terminal device.

According to a first aspect, a wireless communication method is provided. The method includes: A terminal device receives first indication information from a network device, where the first indication information is used to indicate a first maximum multiple-input multiple-output (MIMO) layer quantity N used by the terminal device to perform wireless communication, and N is an integer greater than or equal to 1; and the terminal device performs wireless communication with the network device based on the first maximum MIMO layer quantity N.

According to this solution provided in this application, a maximum MIMO layer quantity that needs to be used by the terminal device can be adjusted as required, so that the terminal device can adjust, based on an implementation, a quantity of antennas actually used during communication, thereby reducing power consumption of the terminal device while ensuring transmission quality.

With reference to the first aspect, in some implementations of the first aspect, the first indication information is carried in downlink control information (DCI).

With reference to the first aspect, in some implementations of the first aspect, the first indication information is carried in a first field of the DCI, and the first indication information indicates an index value corresponding to a maximum MIMO layer quantity configured by the network device. A length of the DCI to which the first field is added is longer than a length of the original DCI without the first field.

According to this solution provided in this application, the maximum MIMO layer quantity that is used by the terminal device to perform wireless communication and that needs to be adjusted is displayed by using the DCI used for scheduling, so that the terminal device can dynamically switch the maximum MIMO layer quantity based on the DCI used for scheduling.

With reference to the first aspect, in some implementations of the first aspect, the first indication information includes a target minimum slot offset value that is indicated by the network device to be used by the terminal device; and the method further includes: The terminal device determines, based on information about a first mapping relationship, a maximum MIMO layer quantity corresponding to the target minimum slot offset value as the first maximum MIMO layer quantity N, where the information about the first mapping relationship is used to indicate correspondences between a plurality of minimum slot offset values between a control channel and a data channel and a plurality of maximum MIMO layer quantities, and one minimum slot offset value corresponds to one maximum MIMO layer quantity.

According to a solution provided in this application, by using the correspondences between the minimum slot offset values and the maximum MIMO layer quantities, the terminal device can switch the maximum MIMO layer quantity while dynamically switching the minimum slot offset value by using the DCI.

With reference to the first aspect, in some implementations of the first aspect, the information about the first mapping relationship is a first mapping relationship configured by the network device for the terminal device.

With reference to the first aspect, in some implementations of the first aspect, the information about the first mapping relationship is a first mapping relationship specified in a protocol.

With reference to the first aspect, in some implementations of the first aspect, the terminal device sends first assistance information to the network device, where the first assistance information is used to determine the information about the first mapping relationship.

With reference to the first aspect, in some implementations of the first aspect, the first indication information includes a target slot offset value that is indicated by the network device to be used by the terminal device; and the method further includes: The terminal device determines, based on information about a second mapping relationship, a maximum MIMO layer quantity corresponding to the target slot offset value as the first maximum MIMO layer quantity N, where the information about the second mapping relationship is used to indicate correspondences between a plurality of slot offset values between a control channel and a data channel and a plurality of maximum MIMO layer quantities, and one slot offset value corresponds to one maximum MIMO layer quantity.

According to a solution provided in this application, by using the correspondences between the slot offset values and the maximum MIMO layer quantities, the terminal device can switch the maximum MIMO layer quantity while dynamically switching the slot offset value by using the DCI.

With reference to the first aspect, in some implementations of the first aspect, the information about the second mapping relationship is a second mapping relationship configured by the network device for the terminal device.

With reference to the first aspect, in some implementations of the first aspect, the information about the second mapping relationship is a second mapping relationship specified in a protocol.

With reference to the first aspect, in some implementations of the first aspect, the terminal device sends second assistance information to the network device, where the second assistance information is used to determine the information about the second mapping relationship.

With reference to the first aspect, in some implementations of the first aspect, the first indication information includes a target minimum slot offset value that is indicated by the network device to be used by the terminal device; and the method further includes: the terminal device determines, based on information about a third mapping relationship, a maximum MIMO layer quantity corresponding to the target minimum slot offset value as the first maximum MIMO layer quantity N. The information about the third mapping relationship includes: if a minimum slot offset value is greater than a first threshold, a maximum MIMO layer quantity corresponding to the minimum slot offset value is a first layer quantity; if the minimum slot offset value is equal to the first threshold, the maximum MIMO layer quantity corresponding to the minimum slot offset value is a second layer quantity; or if the minimum slot offset value is less than the first threshold, the maximum MIMO layer quantity corresponding to the minimum slot offset value is a third layer quantity.

With reference to the first aspect, in some implementations of the first aspect, the first layer quantity is equal to the second layer quantity, and the first layer quantity is not equal to the third layer quantity.

With reference to the first aspect, in some implementations of the first aspect, the third layer quantity is equal to the second layer quantity, and the first layer quantity is not equal to the third layer quantity.

With reference to the first aspect, in some implementations of the first aspect, the first layer quantity, the second layer quantity, and the third layer quantity are not equal.

According to a solution provided in this application, by using correspondences between minimum slot offset values and maximum MIMO layer quantities, the terminal device can switch the maximum MIMO layer quantity while dynamically switching the minimum slot offset value by using the DCI.

With reference to the first aspect, in some implementations of the first aspect, the information about the third mapping relationship is a third mapping relationship configured by the network device for the terminal device.

With reference to the first aspect, in some implementations of the first aspect, the information about the third mapping relationship is a third mapping relationship specified in a protocol.

With reference to the first aspect, in some implementations of the first aspect, the terminal device sends third assistance information to the network device, where the third assistance information is used to determine the information about the third mapping relationship.

With reference to the first aspect, in some implementations of the first aspect, the first indication information includes a target slot offset value that is indicated by the network device to be used by the terminal device; and the method further includes: the terminal device determines, based on information about a fourth mapping relationship, a maximum MIMO layer quantity corresponding to the target slot offset value as the first maximum MIMO layer quantity N. The information about the fourth mapping relationship includes: if a slot offset value is greater than a second threshold, a maximum MIMO layer quantity corresponding to the slot offset value is a fourth layer quantity; if the slot offset value is equal to the second threshold, the maximum MIMO layer quantity corresponding to the slot offset value is a fifth layer quantity; or if the slot offset value is less than the second threshold, the maximum MIMO layer quantity corresponding to the slot offset value is a sixth layer quantity.

With reference to the first aspect, in some implementations of the first aspect, the fourth layer quantity is equal to the fifth layer quantity, and the fourth layer quantity is not equal to the sixth layer quantity.

With reference to the first aspect, in some implementations of the first aspect, the sixth layer quantity is equal to the fifth layer quantity, and the fourth layer quantity is not equal to the sixth layer quantity.

With reference to the first aspect, in some implementations of the first aspect, the fourth layer quantity, the fifth layer quantity, and the sixth layer quantity are not equal.

According to this solution provided in this application, by using correspondences between slot offset values and maximum MIMO layer quantities, the terminal device can switch the maximum MIMO layer quantity while dynamically switching the slot offset value by using the DCI.

With reference to the first aspect, in some implementations of the first aspect, the information about the fourth mapping relationship is a fourth mapping relationship configured by the network device for the terminal device.

With reference to the first aspect, in some implementations of the first aspect, the information about the fourth mapping relationship is a fourth mapping relationship specified in a protocol.

With reference to the first aspect, in some implementations of the first aspect, the terminal device sends fourth assistance information to the network device, where the fourth assistance information is used to determine the information about the fourth mapping relationship.

With reference to the first aspect, in some implementations of the first aspect, the method further includes: the terminal device determines a quantity of receive antennas or a quantity of transmit antennas based on the first maximum MIMO layer quantity N.

With reference to the first aspect, in some implementations of the first aspect, that the terminal device performs wireless communication with the network device based on the first maximum MIMO layer quantity N includes: the terminal device determines a quantity of receive antennas or a quantity of transmit antennas based on the first maximum MIMO layer quantity N and the target minimum slot offset value between the control channel and the data channel.

With reference to the first aspect, in some implementations of the first aspect, if the target minimum slot offset value minimum K0 corresponding to the first maximum MIMO layer quantity N is greater than or equal to antenna switching time Y, the terminal device determines that a quantity of antennas for communication is M, where M is an integer greater than or equal to 1, and M<N; or if the target minimum K0 corresponding to the first maximum MIMO layer quantity N is less than Y, the terminal device determines that the quantity of antennas for communication is N.

According to a solution provided in this application, the quantity of receive antennas or the quantity of transmit antennas is determined based on the first maximum MIMO layer quantity N and the target minimum slot offset value between the control channel and the data channel, so that the terminal device can adjust, as required, the quantity of antennas that need to be used, to further reduce the power consumption.

With reference to the first aspect, in some implementations of the first aspect, that the terminal device performs wireless communication with the network device based on the first maximum MIMO layer quantity N includes: the terminal device determines a quantity of receive antennas or a quantity of transmit antennas based on the first maximum MIMO layer quantity N and the target slot offset value between the control channel and the data channel.

With reference to the first aspect, in some implementations of the first aspect, if the target slot offset value K0 corresponding to the first maximum MIMO layer quantity N is greater than or equal to antenna switching time Y, the terminal device determines that a quantity of antennas for communication is M, where M is an integer greater than or equal to 1, and M<N; or if the target K0 corresponding to the first maximum MIMO layer quantity N is less than Y, the terminal device determines that the quantity of antennas for communication is N.

According to a solution provided in this application, the quantity of receive antennas or the quantity of transmit antennas is determined based on the first maximum MIMO layer quantity N and the target slot offset value between the control channel and the data channel, so that the terminal can adjust, as required, the quantity of antennas that need to be used, to further reduce power consumption.

With reference to the first aspect, in some implementations of the first aspect, the maximum MIMO layer quantity includes a maximum uplink MIMO layer quantity and/or a maximum downlink MIMO layer quantity.

According to a second aspect, a wireless communication method is provided. The method includes: A network device sends first indication information to a terminal device, where the first indication information is used to indicate a first maximum multiple-input multiple-output (MIMO) layer quantity N used by the terminal device to perform wireless communication, and N is an integer greater than or equal to 1; and the network device performs wireless communication with the terminal device based on the first maximum MIMO layer quantity N.

According to a solution provided in this application, a maximum MIMO layer quantity that needs to be used by the terminal device can be updated as required, so that the terminal device can adjust, based on an implementation, a quantity of antennas actually used during communication, thereby reducing power consumption of the terminal device while ensuring transmission quality.

With reference to the second aspect, in some implementations of the second aspect, the first indication information is carried in DCI.

With reference to the second aspect, in some implementations of the second aspect, the first indication information is carried in a first field of the DCI, and the first indication information indicates an index value corresponding to the maximum MIMO layer quantity configured by the network device. A length of the DCI to which the first field is added is longer than a length of the original DCI without the first field.

According to a solution provided in this application, the maximum MIMO layer quantity that is used by the terminal device to perform wireless communication and that needs to be updated is displayed by using the DCI used for scheduling, so that the terminal device can dynamically adjust the maximum MIMO layer quantity based on the DCI used for scheduling.

With reference to the second aspect, in some implementations of the second aspect, the first indication information includes a target minimum slot offset value that is indicated by the network device to be used by the terminal device; and the first maximum MIMO layer quantity N is a maximum MIMO layer quantity that corresponds to the target minimum slot offset value and that is indicated by a first mapping relationship, information about the first mapping relationship is used to indicate correspondences between a plurality of minimum slot offset values between a control channel and a data channel and a plurality of maximum MIMO layer quantities, and one minimum slot offset value corresponds to one maximum MIMO layer quantity.

According to this solution provided in this application, by using the correspondences between the minimum slot offset values and the maximum MIMO layer quantities, the terminal device can switch the maximum MIMO layer quantity while dynamically switching the minimum slot offset value by using the DCI.

With reference to the second aspect, in some implementations of the second aspect, the information about the first mapping relationship is a first mapping relationship configured by the network device for the terminal device.

With reference to the second aspect, in some implementations of the second aspect, the information about the first mapping relationship is a first mapping relationship specified in a protocol.

With reference to the second aspect, in some implementations of the second aspect, the network device receives first assistance information from the terminal device, where the first assistance information is used to determine the information about the first mapping relationship.

With reference to the second aspect, in some implementations of the second aspect, the first indication information includes a target slot offset value that is indicated by the network device to be used by the terminal device; and the first maximum MIMO layer quantity N is a maximum MIMO layer quantity that corresponds to the target slot offset value and that is indicated by a second mapping relationship. The second mapping relationship is used to indicate correspondences between a plurality of slot offset values between a control channel and a data channel and a plurality of maximum MIMO layer quantities, and one slot offset value corresponds to one maximum MIMO layer quantity.

According to a solution provided in this application, by using the correspondences between the slot offset values and the maximum MIMO layer quantities, the terminal device can switch the maximum MIMO layer quantity while dynamically switching the slot offset value by using the DCI.

With reference to the second aspect, in some implementations of the second aspect, the information about the second mapping relationship is a second mapping relationship configured by the network device for the terminal device.

With reference to the second aspect, in some implementations of the second aspect, the information about the second mapping relationship is a second mapping relationship specified in a protocol.

With reference to the second aspect, in some implementations of the second aspect, the network device receives second assistance information from the terminal device, where the second assistance information is used to determine the information about the second mapping relationship.

With reference to the second aspect, in some implementations of the second aspect, the first indication information includes a target minimum slot offset value that is indicated by the network device to be used by the terminal device; and the first maximum MIMO layer quantity N is a maximum MIMO layer quantity that corresponds to the target minimum slot offset value and that is indicated by a third mapping relationship. Information about the third mapping relationship includes: if a minimum slot offset value is greater than a first threshold, a maximum MIMO layer quantity corresponding to the minimum slot offset value is a first layer quantity; if the minimum slot offset value is equal to the first threshold, the maximum MIMO layer quantity corresponding to the minimum slot offset value is a second layer quantity; or if the minimum slot offset value is less than the first threshold, the maximum MIMO layer quantity corresponding to the minimum slot offset value is a third layer quantity.

With reference to the second aspect, in some implementations of the second aspect, the first layer quantity is equal to the second layer quantity, and the first layer quantity is not equal to the third layer quantity.

With reference to the second aspect, in some implementations of the second aspect, the third layer quantity is equal to the second layer quantity, and the first layer quantity is not equal to the third layer quantity.

With reference to the second aspect, in some implementations of the second aspect, the first layer quantity, the second layer quantity, and the third layer quantity are not equal.

According to a solution provided in this application, by using the correspondences between the minimum slot offset values and the maximum MIMO layer quantities, the terminal device can switch the maximum MIMO layer quantity while dynamically switching the minimum slot offset value by using the DCI.

With reference to the second aspect, in some implementations of the second aspect, the information about the third mapping relationship is a third mapping relationship configured by the network device for the terminal device.

With reference to the second aspect, in some implementations of the second aspect, the information about the third mapping relationship is a third mapping relationship specified in a protocol.

With reference to the second aspect, in some implementations of the second aspect, the network device receives third assistance information from the terminal device, where the third assistance information is used to determine the information about the third mapping relationship.

With reference to the second aspect, in some implementations of the second aspect, the first indication information includes a target slot offset value that is indicated by the network device to be used by the terminal device; and the first maximum MIMO layer quantity N is a maximum MIMO layer quantity that corresponds to the target slot offset value and that is indicated by a fourth mapping relationship. Information about the fourth mapping relationship includes: if a slot offset value is greater than a second threshold, a maximum MIMO layer quantity corresponding to the slot offset value is a fourth layer quantity; if the slot offset value is equal to the second threshold, the maximum MIMO layer quantity corresponding to the slot offset value is a fifth layer quantity; or if the slot offset value is less than the second threshold, the maximum MIMO layer quantity corresponding to the slot offset value is a sixth layer quantity.

With reference to the second aspect, in some implementations of the second aspect, the fourth layer quantity is equal to the fifth layer quantity, and the fourth layer quantity is not equal to the sixth layer quantity.

With reference to the second aspect, in some implementations of the second aspect, the sixth layer quantity is equal to the fifth layer quantity, and the fourth layer quantity is not equal to the sixth layer quantity.

With reference to the second aspect, in some implementations of the second aspect, the fourth layer quantity, the fifth layer quantity, and the sixth layer quantity are not equal.

According to a solution provided in this application, by using the correspondences between the slot offset values and the maximum MIMO layer quantities, the terminal device can switch the maximum MIMO layer quantity while dynamically switching the slot offset value by using the DCI.

With reference to the second aspect, in some implementations of the second aspect, the information about the fourth mapping relationship is a fourth mapping relationship configured by the network device for the terminal device.

With reference to the second aspect, in some implementations of the second aspect, the information about the fourth mapping relationship is a fourth mapping relationship specified in a protocol.

With reference to the second aspect, in some implementations of the second aspect, the network device receives fourth assistance information from the terminal device, where the fourth assistance information is used to determine the information about the fourth mapping relationship.

With reference to the second aspect, in some implementations of the second aspect, the maximum MIMO layer quantity includes a maximum uplink MIMO layer quantity and/or a maximum downlink MIMO layer quantity.

According to a third aspect, a terminal device is provided. The terminal device includes each module or unit configured to perform the method according to any one of the first aspect and the possible implementations of the first aspect.

According to this solution provided in this application, a maximum MIMO layer quantity that needs to be used by the terminal device can be updated as required, so that the terminal device can adjust, based on an implementation, a quantity of antennas actually used during communication, thereby reducing power consumption of the terminal device while ensuring transmission quality.

According to a fourth aspect, a network device is provided. The network device includes each module or unit configured to perform the method according to any one of the second aspect and the possible implementations of the second aspect.

According to a solution provided in this application, a maximum MIMO layer quantity that needs to be used by a terminal device can be updated as required, so that the terminal device can adjust, based on an implementation, a quantity of antennas actually used during communication, thereby reducing power consumption of the terminal device while ensuring transmission quality.

According to a fifth aspect, a communication apparatus is provided. The communication apparatus includes a processor. The processor is coupled to a memory, and may be configured to execute instructions in the memory, to implement the method according to any one of the first aspect and the possible implementations of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in the terminal device. When the communication apparatus is the chip configured in the terminal device, the communication interface may be an input/output interface.

Optionally, the transceiver may be a transceiver circuit. Optionally, the input/output interface may be an input/output circuit.

According to a sixth aspect, a communication apparatus is provided. The apparatus includes a processor. The processor is coupled to a memory, and may be configured to execute instructions in the memory, to implement the method according to any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in the network device. When the communication apparatus is the chip disposed in the network device, the communication interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to: receive a signal through the input circuit, and transmit a signal through the output circuit, to enable the processor to perform the method according to any one of the first aspect and the second aspect and the possible implementations of the first aspect and the second aspect.

In an implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

According to an eighth aspect, a processing apparatus is provided. The apparatus includes a processor and a memory. The processor is configured to read instructions stored in the memory, and may receive a signal by using a receiver, and transmit a signal by using a transmitter, to perform the method according to any one of the first aspect and the second aspect and the possible implementations of the first aspect and the second aspect.

Optionally, there are one or more processors, and there are one or more memories.

Optionally, the memory may be integrated with the processor, or the memory and the processor are separately disposed.

In an implementation process, the memory may be a non-transitory (non-transitory) memory, for example, a read-only memory (ROM). The memory and the processor may be integrated on a same chip, or may be separately disposed on different chips. A type of the memory and a manner of disposing the memory and the processor are not limited in the embodiments of this application.

It should be understood that, a related data exchange process, for example, sending of indication information may be a process of outputting the indication information from the processor, and receiving of information may be a process of receiving the input information by the processor. Specifically, data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or instructions). When the computer program runs, a computer is enabled to perform the method according to any one of the first aspect and the second aspect and the possible implementations of the first aspect and the second aspect.

According to a tenth aspect, a computer-readable storage medium is provided. The computer-readable storage medium stores a computer program (which may also be referred to as code or instructions). When the computer program runs on a computer, the computer is enabled to perform the method according to any one of the first aspect and the second aspect and the possible implementations of the first aspect and the second aspect.

According to an eleventh aspect, a chip system is provided. The chip system includes: a processor, configured to invoke and run a computer program from a memory, so that a communication device on which the chip system is installed performs the method according to any one of the first aspect and the second aspect and the possible implementations of the first aspect and the second aspect.

According to a twelfth aspect, a communication system is provided. The communication system includes the foregoing network device and the foregoing terminal device.

DESCRIPTION OF EMBODIMENTS

The following describes technical solutions of this application with reference to accompanying drawings.

The technical solutions in the embodiments of this application may be applied to various communication systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future $5^{th}$ generation (5G) system or a new radio (NR) system, vehicle-to-everything (vehicle-to-X, V2X), long term evolution-vehicle (LTE-V), an internet of vehicles, machine type communication (MTC), an internet of things (IoT), long term evolution-machine (LTE-M), and machine to machine (M2M), where V2X may include vehicle to network (V2N), vehicle to vehicle (vehicle-to-vehicle, V2V), vehicle to infrastructure (V2I), vehicle to pedestrian (V2P), and the like.

Figure 1:
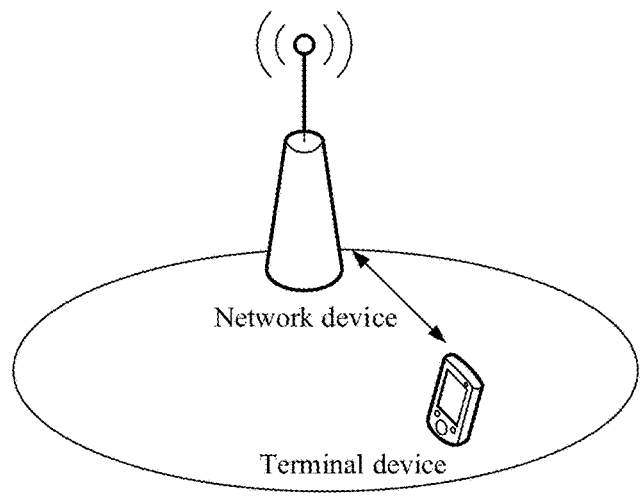
FIG. 1 is a schematic diagram of an architecture of a communication system according to embodiments of this application.

FIG. 1 is a schematic diagram of a network architecture according to embodiments of this application. As shown in FIG. 1, a communication system in embodiments of this application may include a network device and a plurality of terminal devices. The network device may include one or more antennas. In addition, the network device may additionally include a transmitter chain and a receiver chain. A person of ordinary skill in the art may understand that the transmitter chain and the receiver chain each may include a plurality of components (such as a processor, a modulator, a multiplexer, a demodulator, a demultiplexer, or an antenna) related to signal sending and receiving.

The network device may communicate with the plurality of terminal devices. The terminal device in the embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device having a wireless connection function or a vehicle-mounted device. Currently, examples of some terminals are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), and/or any other suitable device configured to perform communication in a wireless communication system. This is not limited to the embodiments of this application.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn by a user or integrated into clothes or an accessory of the user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device in embodiments of this application may alternatively be a terminal device in an internet of things system. IoT is an important part of future development of information technologies. A main technical feature of the IoT is connecting a thing to a network by using a communication technology, to implement an intelligent network for interconnection between a person and a machine or between things.

In addition, in the embodiments of this application, the terminal device may further include a sensor, for example, an intelligent printer, a train detector, or a gas station. Main functions of the terminal device include collecting data (for some terminal devices), receiving control information and downlink data from a network device, sending an electromagnetic wave, and sending uplink data to a network device.

The network device in the embodiments of this application may be a device configured to communicate with a terminal device. The network device may be a base transceiver station (BTS) in a global system for mobile communications (GSM) system or a code division multiple access (CDMA) system, may be a NodeB (NB) in a wideband code division multiple access (WCDMA) system, or may be an evolved NodeB (eNB or eNodeB) in an LTE system, may be a radio controller in a cloud radio access network (CRAN) scenario, or may be a radio network controller (RNC), a base station controller (BSC), a home base station (for example, home evolved nodeB, or home nodeB, HNB), a baseband unit (BBU). The network device may alternatively be a relay station, an access point, a vehicle-mounted device, a wearable device, a network device in a future 5G network, a network device in a future evolved PLMN, or the like, may be an access point (AP), a wireless relay node, a wireless backhaul node, a transmission point (TP), a transmission reception point (transmission and reception point, TRP), or the like in a WLAN, may be a gNB or a transmission point (TRP or TP) in a new radio (NR) system, or one or a group of antenna panels (including a plurality of antenna panels) of a gNodeB in a 5G system, or may be a network node, for example, a baseband unit (BBU) or a distributed unit (DU), constituting a gNB or a transmission point. This is not limited to the embodiments of this application.

In some deployments, the gNB may include a centralized unit (CU) and a DU. The gNB may further include an active antenna unit (AAU for short). The CU implements some functions of the gNB, and the DU implements some functions of the gNB. For example, the CU is responsible for processing a non-real-time protocol and a non-real-time service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (radio access network, RAN), or may be a network device in a core network (CN). This is not limited in this application.

In addition, in embodiments of this application, the network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. The small cells are characterized by small coverage and a low transmit power, and are applicable to providing a high-rate data transmission service.

In addition, in embodiments of this application, the network device may include a base station (gNB), for example, a macro base station, a micro base station, an indoor hotspot, or a relay node, and has functions of: sending a radio wave to the terminal device, to implement downlink data transmission on one the hand and control uplink transmission by sending scheduling information on the other hand, and receiving a radio wave sent by the terminal device, to receive uplink data transmission.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communication software. In addition, a specific structure of an entity for performing a method provided in the embodiments of this application is not particularly limited in the embodiments of this application, provided that the entity can run a program that records code of the method provided in embodiments of this application to perform communication according to the method provided in embodiments of this application. For example, the entity for performing the method provided in embodiments of this application may be a terminal device, a network device, or a functional module that is in the terminal device or the network device and that can invoke and execute the program.

In addition, aspects or features in embodiments of this application may be implemented as a method, an apparatus, or a product that uses standard programming and/or engineering technologies. The term "product" used in embodiments of this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), and a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

It should be noted that in embodiments of this application, a plurality of applications may be run at the application layer. In this case, an application for performing the communication method in the embodiments of this application and an application configured to control a receive end device to implement an action corresponding to the received data may be different applications.

The terminal device communicates with the network device. The network device may send information to the terminal device through a forward link (which is also referred to as a downlink), and receive information from the terminal device through a reverse link (which is also referred to as an uplink).

For example, in a frequency division duplex (FDD) system, the forward link and the reverse link may use different frequency bands.

For another example, in a time division duplex (TDD) system and a full-duplex system, the forward link and the reverse link may use a same frequency band.

At a given time, the network device or the terminal device may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits to be sent on a channel to the wireless communication receiving apparatus. The data bits may be included in a transport block (or a plurality of transport blocks) of the data, and the transport block may be segmented to generate a plurality of code blocks.

In addition, the communication system may be a PLMN, a device-to-device (D2D) network, a machine to machine (M2M) network, an IoT network, or another network. FIG. 1 is merely an example of a simplified schematic diagram. The network may further include another network device, which is not shown in FIG. 1.

In embodiments of this application, data or information may be carried on a time-frequency resource, and the time-frequency resource may include a resource in time domain and a resource in frequency domain.

In embodiments of this application, a resource unit (resource element, RE) may be a minimum physical resource, and one RE may correspond to one subcarrier in one orthogonal frequency division multiplexing (OFDM) symbol (which is referred to as a symbol for short below).

A basic time unit of uplink/downlink resource scheduling in new radio (NR) is one slot, and one slot includes 14 OFDM symbols in terms of time.

In a $5^{th}$ generation radio access system standard NR, a basic unit in frequency domain is one subcarrier, and a subcarrier spacing may be 15 kHz, 30 kHz, or the like. At a physical layer in NR, a unit of a downlink frequency domain resource is a resource block (RB).

In embodiments of this application, each RB includes one symbol in time domain and 12 consecutive subcarriers in frequency domain.

A subcarrier is a basic unit in frequency domain, and a subcarrier spacing (or a width of the subcarrier) may be 15 kHz, 30 kHz, 60 kHz, 120 kHz, 240 kHz, 480 kHz, or the like.

By way of example, and not limitation, the communication method in the embodiments of this application may be applied to, for example, a communication system having a high bandwidth.

Specifically, with the increase of mobile users and emergence of large-capacity services (such as high-definition video services), an important requirement in the evolution of mobile communication to a future 5G system or NR system is to support a high bandwidth. A higher bandwidth indicates more bandwidth resources used for data transmission and a larger traffic volume that can be supported. In a communication system in which a carrier bandwidth is a high bandwidth, a bandwidth supported by UE may be lower than the carrier bandwidth in consideration of costs of the UE and a traffic volume of the UE. If the bandwidth supported by the UE is higher, a processing capability of the UE is stronger, a data transmission rate of the UE may be higher, and design costs of the UE may be higher. For example, in a 5G system, a maximum of the carrier bandwidth may be 400 megahertz (MHz), and a radio frequency bandwidth capability of the UE may be 20 MHz, 50 MHz, 100 MHz, or the like. In a wireless communication system, radio frequency bandwidth capabilities of different Ues may be the same or may be different.

In the communication system in which the carrier bandwidth is a high bandwidth, because a radio frequency bandwidth capability of the UE is less than the carrier bandwidth, the concept of a bandwidth part (bandwidth part or carrier bandwidth part, BWP) is proposed. To be specific, one BWP includes several consecutive RBs in frequency domain. A terminal device performs transmission in a BWP of the terminal device. The BWP may be a group of consecutive frequency domain resources on a carrier, and the frequency domain resources that may be occupied by different BWPs may partially overlap or may not overlap.

Figure 2:
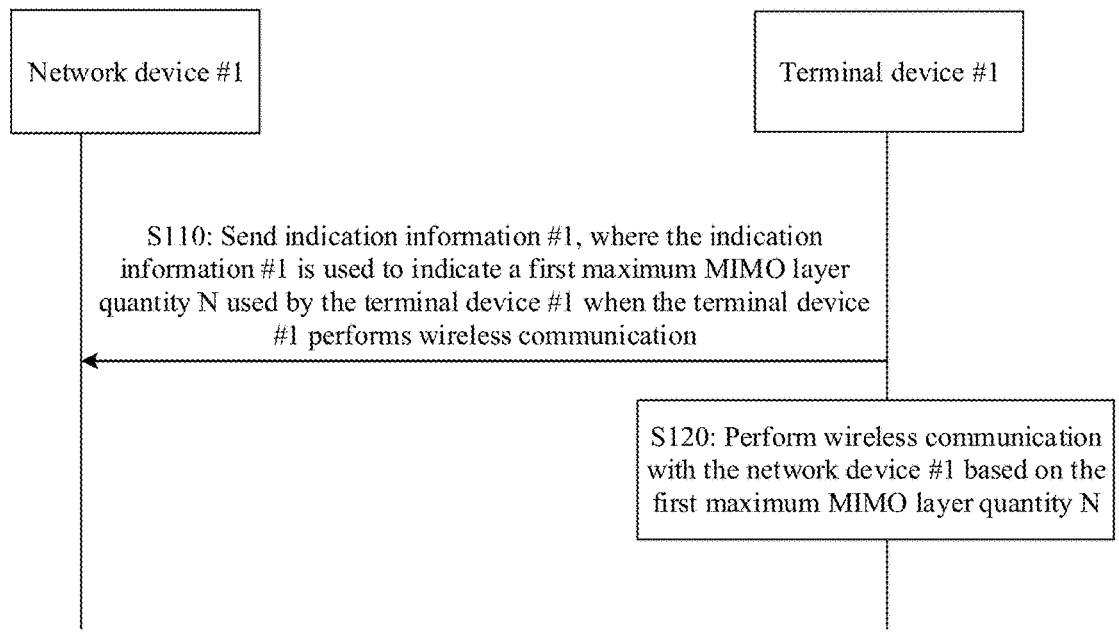
FIG. 2 is a schematic flowchart of a wireless communication method according to embodiments of this application.

FIG. 2 is a schematic diagram of an example of a wireless communication method 100 according to embodiments of this application.

A network device #1 may determine a first maximum multiple-input multiple-output (MIMO) layer quantity N used by a terminal device #1 when the terminal device #1 performs wireless communication. The terminal device #1 may send assistance information #1 to the network device #1 in advance, and the network device #1 may determine, based on the assistance information #1, the first maximum MIMO layer quantity N used by the terminal device #1 when the terminal device #1 performs wireless communication. For example, the assistance information #1 may be the first maximum MIMO layer quantity N that the terminal device #1 utilizes.

As shown in FIG. 2, in S110, the network device #1 may send indication information #1 (namely, an example of first indication information) to the terminal device #1. The indication information #1 is used to indicate the first maximum MIMO layer quantity N used by the terminal device #1 when the terminal device #1 performs wireless communication, where N is an integer greater than or equal to 1.

By way of example, and not limitation, receiving the indication information #1 may include receiving and/or detecting the indication information #1.

It should be noted that, compared with a conventional technology in which a maximum MIMO layer quantity is bound to a BWP, and a corresponding maximum MIMO layer quantity may be configured for each BWP, in embodiments of this application, adjustment of a maximum MIMO layer quantity is supported in a same BWP, to be specific, in embodiments of this application, first indication information is independent of the BWP indication information. For example, in embodiments of this application, the following cases may be included:

I. In a period in which a same BWP is used, two pieces of first indication information are received, and the two pieces of first indication information may indicate different first maximum MIMO layer quantities.

II. RRC signaling or downlink control information (DCI) includes other indication information related to a BWP, and further includes indication information of a first maximum MIMO layer quantity.

III. In a period in which different BWPs are used, first maximum MIMO layer quantities indicated by first indication information may be the same.

In embodiments of this application, the indication information #1 may directly indicate the first maximum MIMO layer quantity (namely, the case 1), or the indication information #1 may indicate the corresponding maximum MIMO layer quantity by indicating other information that is configured with the first maximum MIMO layer quantity in a binding manner (namely, the case 2). Subsequently, specific processes of the foregoing case 1 and case 2 are described in detail.

In S120, the terminal device #1 may perform wireless communication with the network device #1 based on the first maximum MIMO layer quantity N.

That the terminal device #1 performs wireless communication with the network device #1 based on the first maximum MIMO layer quantity N may include that the terminal device #1 determines, based on the first maximum MIMO layer quantity N, a quantity of transmit antennas or a quantity of receive antennas used by the terminal device #1 when the terminal device #1 performs wireless communication with the network device #1.

The first maximum MIMO layer quantity may include a maximum uplink MIMO layer quantity and/or a maximum downlink MIMO layer quantity, and that the terminal device #1 determines the first maximum MIMO layer quantity based on the indication information #1 may include: The terminal device #1 determines the maximum uplink MIMO layer quantity and/or the maximum downlink MIMO layer quantity based on the indication information #1. For example, the maximum uplink MIMO layer quantity and the maximum downlink MIMO layer quantity are configured in a binding manner, and the terminal device #1 may determine the maximum uplink MIMO layer quantity and/or the maximum downlink MIMO layer quantity based on the indication information #1. For another example, the maximum uplink MIMO layer quantity and the maximum downlink MIMO layer quantity are not configured in a binding manner, and the terminal device #1 determines the maximum uplink MIMO layer quantity or the maximum downlink MIMO layer quantity based on the indication information #1.

According to this solution provided in embodiments of this application, a maximum MIMO layer quantity that needs to be used by the terminal device can be switched as required, so that the terminal device can adjust, based on an implementation, a quantity of antennas actually used during communication, thereby reducing power consumption of the terminal device while ensuring transmission quality. In addition, compared with that in the conventional technology in which switching of the maximum MIMO layer quantity based on BWP switching requires a relatively high changing delay, causing relatively long corresponding switching time of the maximum MIMO layer quantity, time required for switching the maximum MIMO layer quantity is shorter according to this solution provided in embodiments of this application.

The following describes in detail specific processes of the foregoing case 1 and case 2.

Figure 3:
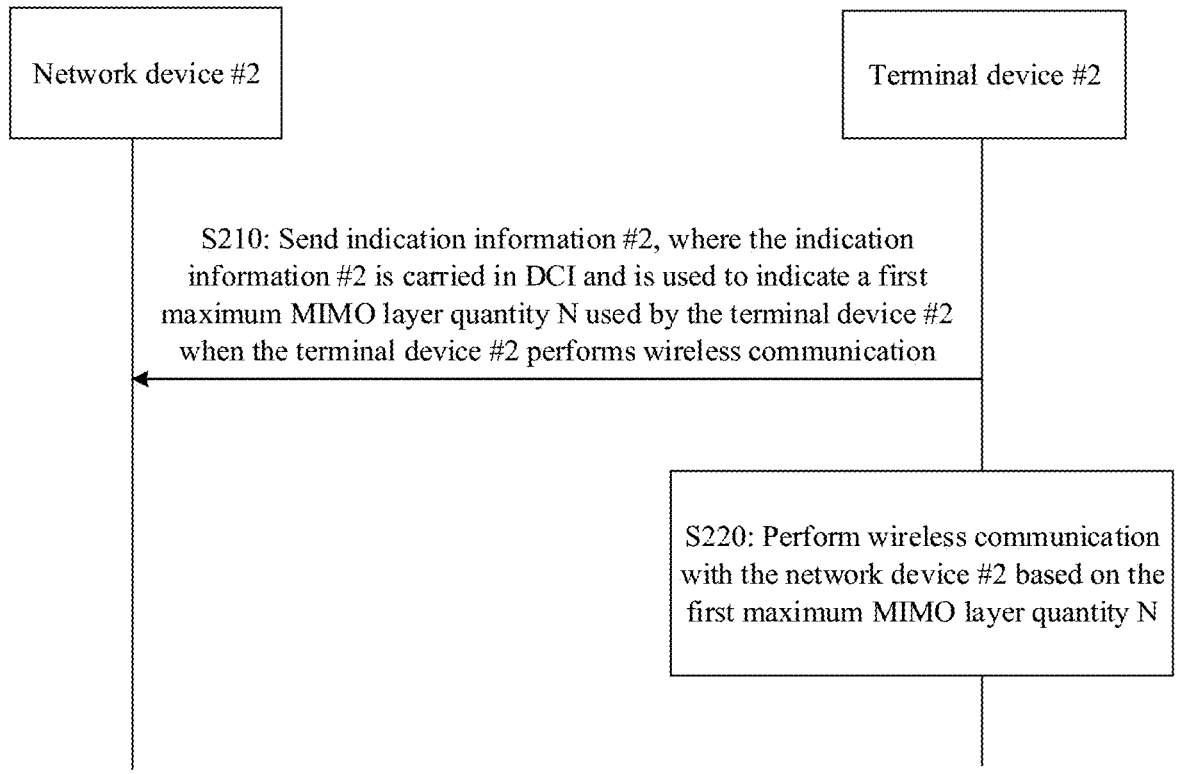
FIG. 3 is a schematic flowchart of a wireless communication method according to other embodiments of this application.

Case 1:

FIG. 3 is a schematic diagram of a wireless communication method 200 according to embodiments of this application.

As shown in FIG. 3, in S210, a network device #2 may send indication information #2 to a terminal device #2, where the indication information #2 may directly indicate a first maximum MIMO layer quantity N used by the terminal device #2 when the terminal device #2 performs wireless communication.

For example, the network device #2 may dynamically indicate, by using DCI, that the maximum MIMO layer quantity used by the terminal device #2 in a subsequent receiving process is changed. In other words, the indication information #2 may be carried in the DCI, for example, carried in a first field of the DCI. The first field carries a value of the first maximum MIMO layer quantity N. For another example, a plurality of states of the first field may also correspond to a plurality of maximum MIMO layer quantities, and the first indication information may indicate an index value corresponding to the maximum MIMO layer quantity configured by the network device. A length of the DCI to which the first field is added is longer than a length of the original DCI without the first field. For ease of understanding and description, the following describes the communication method 200 in embodiments of this application by using a downlink as an example:

Step A-1: The network device #2 configures, by using RRC signaling, that DCI used for scheduling of the terminal device #2 includes a first field used to indicate the first maximum MIMO layer quantity N. For example, the first field is x bits, and corresponds to $2^x$ different states.

Step A-2: The network device #2 configures, by using configuration signaling, different maximum MIMO layers respectively corresponding to the plurality of states (namely, the $2^x$ different states) of the first field.

Step A-3: When the network device #2 needs to switch to the first maximum MIMO layer quantity N (namely, a target maximum MIMO layer quantity), the network device #2 sends the DCI used for scheduling to the terminal device #2 and sets the state of the first field in the DCI used for scheduling to a state that corresponds to the target maximum MIMO layer quantity and that is of the first field (that is, the DCI used for scheduling carries the indication information #2).

The first maximum MIMO layer quantity N indicated by the DCI used for scheduling may be configured as required.

For example, uplink DCI used for scheduling may be used to switch only a maximum uplink MIMO layer quantity, and downlink DCI used for scheduling may be used to switch only a maximum downlink MIMO layer quantity.

For another example, the maximum uplink MIMO layer quantity and the maximum downlink MIMO layer quantity are configured in a binding manner, and the uplink DCI used for scheduling or the downlink DCI used for scheduling may be used to switch the maximum uplink MIMO layer quantity and the maximum downlink MIMO layer quantity that are bound.

After sending the DCI used for scheduling to dynamically indicate the maximum MIMO layer quantity used by the terminal device #2 in a subsequent receiving process, the network device #2 may send DCI to the terminal device #2 to indicate related information required for receiving a data channel, for example, a location and a size of a time-frequency resource of the data channel, and antenna port configuration information.

In S220, the terminal device #2 may perform wireless communication with the network device #2 based on the first maximum MIMO layer quantity N.

Without loss of generality, in an example, the indication information #2 directly indicates that a maximum MIMO layer quantity used by the terminal device #2 when the terminal device #2 performs wireless communication is the first maximum MIMO layer quantity N. N may be a per-BWP configured maximum MIMO layer quantity configured by the network device for a BWP in which the terminal device is currently located, or a default per-cell configured maximum MIMO layer quantity configured by the network device for the terminal device. The network device may indicate, by using the indication information #2, the terminal device #2 to switch between the per-BWP configured maximum MIMO layer quantity and the default per-cell configured maximum MIMO layer quantity.

The terminal device #2 may adjust, based on the first maximum MIMO layer quantity N and an implementation, a quantity of antennas used to communicate with the network device #2. By way of example, and not limitation, the network device #2 may indicate, by using the indication information #2, that the first maximum MIMO layer quantity N used by the terminal device is 2, and the terminal device #2 may receive and/or detect a PDCCH by using only two (receive, Rx) antennas or fewer antennas, to reduce power consumption of the terminal device #2. For another example, the network device #2 may indicate, by using the indication information #2, that the first maximum MIMO layer quantity N used by the terminal device is 4, and the terminal device #2 may receive a PDCCH and a PDSCH by using four receive (Rx) antennas, to ensure a transmission rate of the PDSCH and reduce a communication delay.

It should be understood that the foregoing descriptions are merely examples for description, and should not constitute any limitation on this application. Other indication information that can directly indicate the maximum MIMO layer quantity also falls within the protection scope of this application. For example, the indication information may be carried in a MAC control element (CE). To be specific, the network device may indicate, by using the MAC CE, the maximum MIMO layer quantity to be used by the terminal device when the terminal device performs wireless communication.

According to this solution provided in embodiments of this application, the indication information #2 may be carried in the first field of the DCI, and is used to directly indicate the maximum MIMO layer quantity, and the maximum MIMO layer quantity that is used by the terminal device to perform wireless communication and that needs to be updated is displayed by using the DCI used for scheduling, so that the terminal device can dynamically adjust the maximum MIMO layer quantity based on the DCI used for scheduling, and further, the terminal device #2 can adjust the quantity of antennas used for communication.

Case 2

The indication information may indicate the corresponding maximum MIMO layer quantity by indicating other information that is configured with the first maximum MIMO layer quantity in a binding manner.

In time domain, power consumption of the terminal device may be reduced through cross-slot scheduling. Downlink cross-slot scheduling is described by using a base station and UE as an example. The base station schedules a PDSCH to the UE through a PDCCH, and a slot offset between the PDCCH and the scheduled PDSCH is greater than 0, that is, the scheduled PDSCH and the PDCCH are not in a same slot. Therefore, the UE can reduce unnecessary data buffering, and prolong processing time of the PDCCH, thereby reducing the power consumption.

Figure 4:
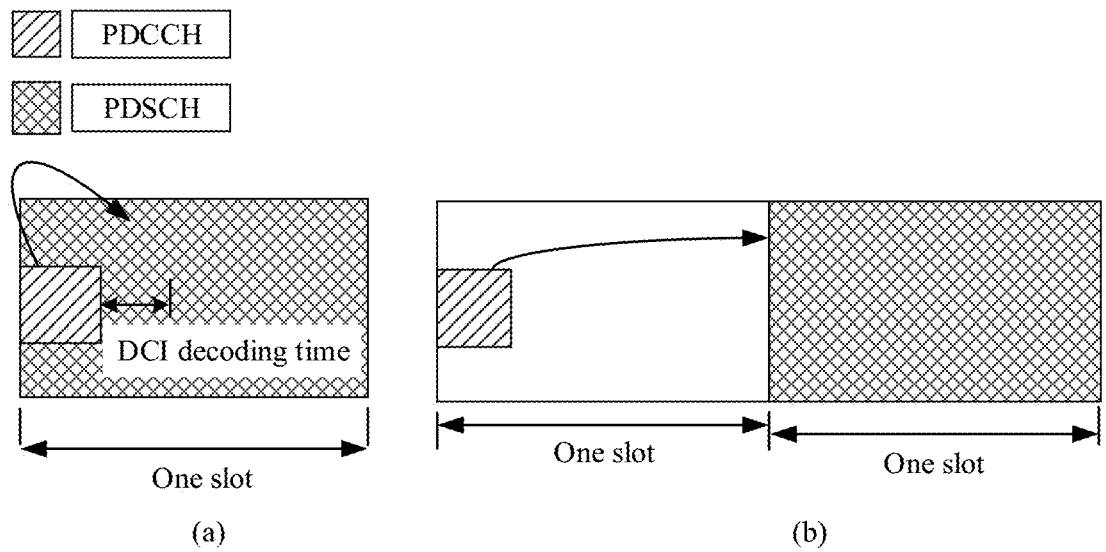
FIG. 4 is a schematic diagram of an example of same-slot scheduling and cross-slot scheduling processes.

FIG. 4 is a schematic diagram of downlink same-slot scheduling (as shown in (a) in FIG. 4) and cross-slot scheduling (as shown in (b) in FIG. 4) that use a base station and UE as an example. In the same-slot scheduling shown in (a) in FIG. 4, a scheduled PDSCH and a PDCCH are located in a same slot, that is, the UE receives the PDCCH and the PDSCH in the same slot. For ease of understanding, a downlink cross-slot scheduling process is described below by using a base station and UE as an example.

Step B-1: The base station configures a time domain resource allocation list of a PDSCH for the UE by using RRC signaling, where the time domain resource allocation list includes a set of slot offsets between a PDCCH and the scheduled PDSCH, and the set of slot offsets includes a set of slot offset values K0s between the PDCCH and the scheduled PDSCH, and a set of start symbols and lengths of the PDSCH in the slot. A value of K0 in the set of slot offset values K0s may be greater than or equal to 0, and a plurality of slot offset values K0s may be configured. For example, the set of slot offset values K0s may be configured as {0, 1, 2, 3, 4, 5, 6}.

Step B-2: The base station explicitly or implicitly indicates an available minimum slot offset value minimum K0 to the UE, where the minimum K0 is greater than 0. For example, the base station explicitly or implicitly indicates the minimum K0 through the PDCCH. If the base station does not indicate the minimum K0, all K0s in the set of slot offset values K0s configured by using the RRC signaling in step (1) are valid; otherwise, K0s less than the minimum K0 are invalid, that is, the K0s less than the minimum K0 cannot be used for scheduling.

Step B-3: The base station schedules the PDSCH to the UE through the PDCCH, where the PDCCH indicates one slot offset value K0 in the set of K0s, and the slot offset value K0 needs to be greater than or equal to the minimum K0. Correspondingly, the UE periodically monitors the PDCCH. When the minimum K0 is greater than 0, the UE only needs to detect the PDCCH and does not need to buffer the possible PDSCH in a current slot, to reduce power consumption of the UE.

Step B-4: If the UE detects that the PDCCH schedules the PDSCH, the UE receives the PDSCH in a slot having the slot offset value K0 indicated by the PDCCH. For example, in (b) in FIG. 4, K0=1, and the UE receives the PDSCH in a slot whose K0 indicated by the PDCCH is 1.

Figure 5:
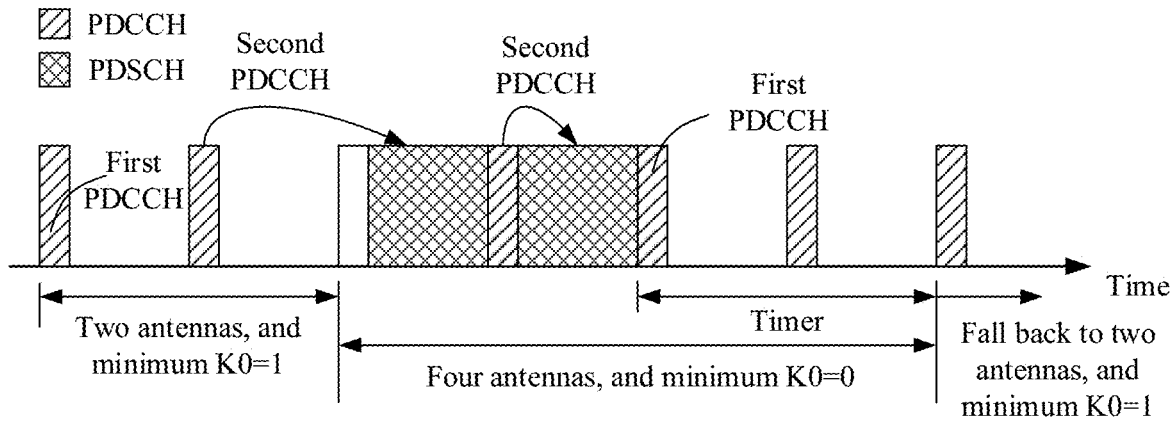
FIG. 5 is a schematic diagram of an example in which UE adjusts a quantity of antennas based on cross-slot scheduling.

In spatial domain, power consumption of the terminal device may be reduced by turning off a portion of the antennas. A larger quantity of working antennas indicates higher power consumption of the terminal device. However, if the quantity of antennas used by the terminal device for communication is reduced, the transmission rate may be affected. A downlink process is described by using a base station and UE as an example. A transmission rate of a PDSCH is related to a quantity of MIMO layers for transmitting the PDSCH, and the transmission rate decreases when the quantity of MIMO layers decreases. The quantity of MIMO layers for transmitting the PDSCH is also related to the quantity of antennas. A quantity of receive antennas of a UE needs to be greater than or equal to the quantity of MIMO layers for transmission. For example, if a maximum MIMO layer quantity configured by the base station for the UE is 4, the base station assumes that the UE has at least four receive antennas. If the UE reduces the quantity of receive antennas when receiving the PDSCH, the transmission rate will be affected, causing a communication delay. In addition, a received signal may be subject to inter-layer interference. In addition, a switching time Y is required for the UE to turn on or off the receive antenna. Therefore, with reference to a minimum K0 for cross-slot scheduling, the UE can further reduce power consumption by implementing dynamic adjustment of the quantity of receive antennas. To be specific, provided that the value of the minimum K0 is appropriate, the minimum K0 may cover the antenna switching time Y. In this way, the UE may receive the PDCCH by using only two or fewer receive antennas, so that the power consumption of the UE can be reduced. The base station schedules the PDSCH through cross-slot scheduling (minimum K0>z, where z may be a preset value covering the antenna switching time Y). The UE has sufficient time to switch from the two or fewer receive antennas to four receive antennas to receive the PDSCH, thereby ensuring data transmission reliability and reducing a transmission delay. In this example, the quantity 2 and the quantity 4 of receive antennas are merely examples. Embodiments of this application is applicable to a switching case of any quantity of antennas. FIG. 5 is a schematic diagram of a process in which UE dynamically adjusts a quantity of receive antennas. The general process of adjusting the quantity of receive antennas is as follows:

Step C-1: A base station explicitly or implicitly indicates an available minimum slot offset value minimum K0 of a slot offset value K0 to UE, where the minimum K0 is greater than z. For example, minimum K0=1 in FIG. 5.

Step C-2: The UE receives and detects a PDCCH by using two receive antennas. The UE periodically blindly detects the PDCCH, but the base station does not necessarily send a PDSCH. A first PDCCH in FIG. 5 indicates that the base station does not send the PDSCH (PDCCH only), that is, PDCCH empty detection is performed.

Step C-3: If the base station needs to schedule data, the base station sends DCI used for scheduling to the UE through a PDCCH, for example, a PDCCH with a scheduling grant (PDCCH with grant), namely, a second PDCCH in FIG. 5. K0 indicated in the DCI used for scheduling is greater than or equal to the minimum K0.

Step C-4: When the UE detects the DCI used for scheduling, the UE turns on four receive antennas. Because the minimum K0 is greater than z, the UE can have sufficient switching time to turn on the four receive antennas. When detecting the DCI used for scheduling, the UE may further switch the subsequent minimum K0 from 1 to 0.

Step C-5: After the UE turns on the four receive antennas, the UE uses the four receive antennas to receive the PDCCH and the PDSCH. The UE may further start a timer or a counter. The timer is used as an example. Each time the UE receives scheduling, the timer recounts.

Step C-6: When the base station does not perform scheduling within a period of time and the timer expires, the UE turns off a part of receive antennas and falls back to two receive antennas to reduce power consumption. The minimum K0 may be switched from 0 to 1.

Step C-7: In the foregoing process, the UE further periodically receives a channel state information reference signal (CSI-RS), measures downlink channel quality, and feeds back channel state information (CSI) to the base station. Based on the implementation of UE, the UE may receive the CSI-RS by using two receive antennas, or may receive the CSI-RS by using four receive antennas. The base station may determine, by using the fed-back CSI, a parameter of the PDCCH and a parameter of scheduling the PDSCH. To avoid affecting scheduling of the PDSCH by the base station, the UE needs to receive the CSI-RS by using four receive antennas.

However, in the foregoing process, when the minimum K0 indicated by the base station cannot cover the antenna switching time Y, to ensure the transmission rate of the PDSCH, the UE turns on four receive antennas to receive and detect the PDCCH, increasing the power consumption of the UE.

Therefore, in embodiments of this application, the indication information may be combined with the cross-slot scheduling, to implement switching of the maximum MIMO layer quantity. A combination form includes but is not limited to the following several forms.

Format 1

Figure 6:
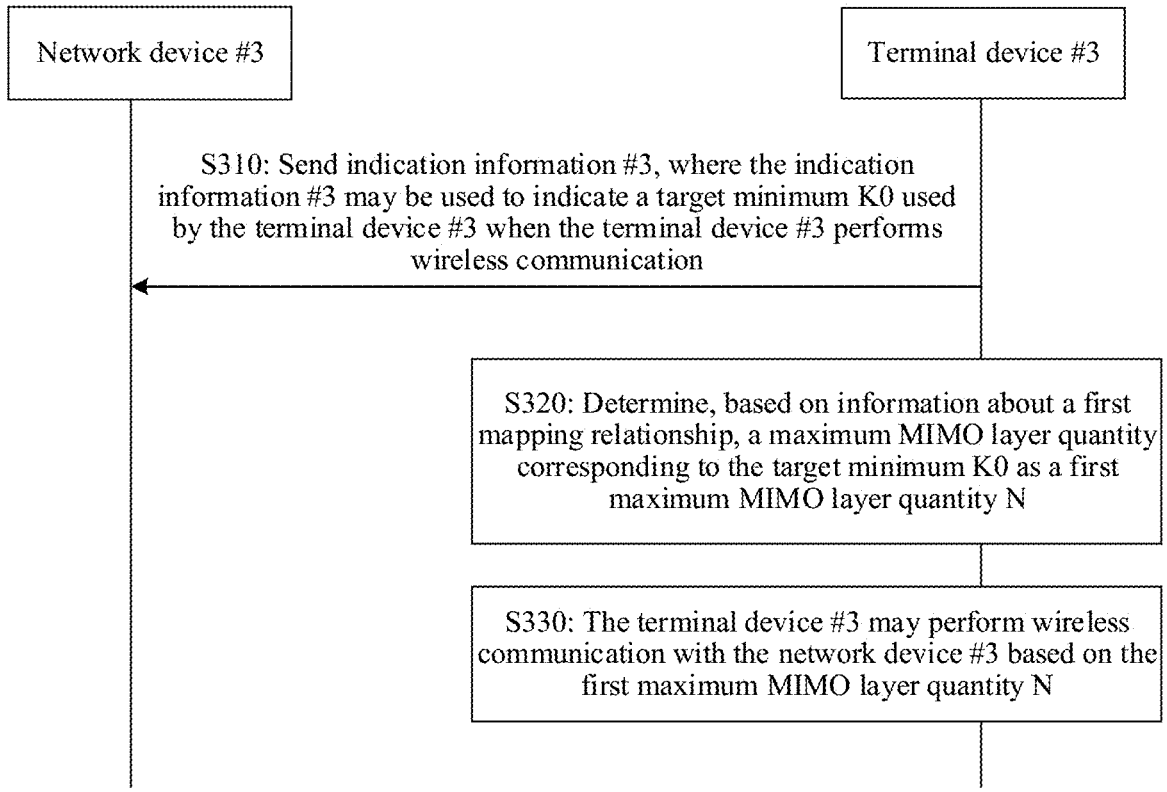
FIG. 6 is a schematic flowchart of a wireless communication method according to other embodiments of this application.

FIG. 6 is a schematic diagram of a wireless communication method 300 according to other embodiments of this application.

A terminal device #3 may send assistance information #3 to a network device #3, where the assistance information #3 is used to determine a first mapping relationship, and information about the first mapping relationship may be used to indicate correspondences between a plurality of minimum slot offset values between a control channel and a data channel and a plurality of maximum MIMO layer quantities, and one minimum slot offset value corresponds to one maximum MIMO layer quantity. The network device #3 may determine the first mapping relationship based on the assistance information #3.

By way of example, and not limitation, the assistance information #3 may include the correspondences between the plurality of minimum slot offset values and the plurality of maximum MIMO layer quantities of the terminal device #3. For example, the terminal device #3 may be UE. The UE reports recommended pairing of a minimum K0 and a corresponding maximum MIMO layer quantity by using UE assistance information. For example, the assistance information #3 may alternatively include time Y required by the terminal device #3 for antenna switching, and the network device #3 may configure the first mapping relationship based on a value of Y.

Because the network device does not know the time required by the terminal device for antenna switching, the terminal device may send the assistance information #3 in advance, so that the network device determines a more appropriate first mapping relationship. For example, a quantity of antennas for receiving the control channel may be less than a quantity of antennas for receiving (or sending) the data channel, so that power consumption of the terminal device is reduced. It should be noted that the assistance information #3 is not necessarily consistent with the first mapping relationship, that is, the network device #3 does not necessarily determine the first mapping relationship based on the assistance information #3 sent by the terminal device #3. The network device #3 may alternatively determine the first mapping relationship.

By way of example, and not limitation, the network device #3 may configure the first mapping relationship for the terminal device #3 by using signaling. Certainly, the first mapping relationship may alternatively be a first mapping relationship uniformly specified in a protocol.

In S310, the network device #3 may send indication information #3 to the terminal device #3, where the indication information #3 may be used to indicate a target minimum slot offset value minimum K0 used by the terminal device #3 when the terminal device #3 performs wireless communication.

In S320, the terminal device #3 determines, based on the information about the first mapping relationship, a maximum MIMO layer quantity corresponding to the target minimum slot offset value minimum K0 as a first maximum MIMO layer quantity N, where the information about the first mapping relationship may be used to indicate the correspondences between the plurality of minimum slot offset values between the control channel and the data channel and the plurality of maximum MIMO layer quantities, and one minimum slot offset value corresponds to one maximum MIMO layer quantity.

To explain and describe the communication method in embodiments of this application in detail, a downlink is used as an example for description, and should not be considered as a limitation on this solution of this application.

For example, a maximum MIMO layer quantity and a minimum K0 in cross-slot scheduling may be configured in a binding manner. The network device #3 uses a DCI indication for switching the minimum K0 and indicates a change of a corresponding maximum MIMO layer quantity. Specifically, an example in which the network device #3 is a base station and the terminal device #3 is UE is used to describe a process in which the network device #3 indicates the change of the maximum MIMO layer quantity of the terminal device #3 in the form 1. The base station and the UE may perform the following steps.

Step D-1: The UE may send assistance information #3 to the base station, and the base station determines, based on the assistance information #3, a first mapping relationship in a period in which a same BWP is used.

Step D-2: The base station may configure the first mapping relationship for the UE, to be specific, when configuring different minimum K0s in cross-slot scheduling, the base station configures maximum MIMO layer quantities corresponding to the minimum K0s; in other words, the maximum MIMO layer quantity and the minimum K0 in the cross-slot scheduling are configured in a binding manner.

Without loss of generality, in an example, the base station may configure the first mapping relationship for the UE, and may configure different minimum K0s corresponding to different maximum MIMO layers used by the UE when the UE performs wireless communication. The maximum MIMO layer quantity may be a per-BWP configured maximum MIMO layer quantity configured by the base station for a BWP in which the UE is currently located, or a default per-cell configured maximum MIMO layer quantity configured by the base station for the UE. The base station may configure, by using configuration information, a minimum K0 corresponding to the per-BWP configured maximum MIMO layer quantity, and a minimum K0 corresponding to the default per-cell configured maximum MIMO layer quantity.

Step D-3: The base station switches, by using L1 signaling, a target minimum K0 used during the cross-slot scheduling, and switches a maximum MIMO layer quantity corresponding to the UE.

In addition, when BWP switching is supported, default maximum MIMO layer quantities corresponding to default minimum K0s may be configured for different BWPs at the same time.

Step D-4: The UE determines, based on information about the first mapping relationship configured in step D-1, a maximum MIMO layer quantity corresponding to a target minimum slot offset value as a first maximum MIMO layer quantity N. To be specific, the UE switches, as indicated by the L1 signaling, the minimum K0 used for the cross-slot scheduling, and determines a corresponding maximum MIMO layer quantity as the first maximum MIMO layer quantity N.

In S330, the terminal device #3 may perform wireless communication with the network device #3 based on the first maximum MIMO layer quantity N.

The terminal device #3 may determine, based on the first maximum MIMO layer quantity N and the target minimum slot offset value between the control channel and the data channel, a quantity of antennas used for wireless communication, so that the quantity of antennas for receiving a downlink control channel is less than the quantity of antennas for receiving (or sending) the data channel. It should be noted that the foregoing manner of determining the quantity of antennas used for wireless communication is not limited to the form 1, and is applicable to the communication method in the embodiments of this application.

Figure 7:
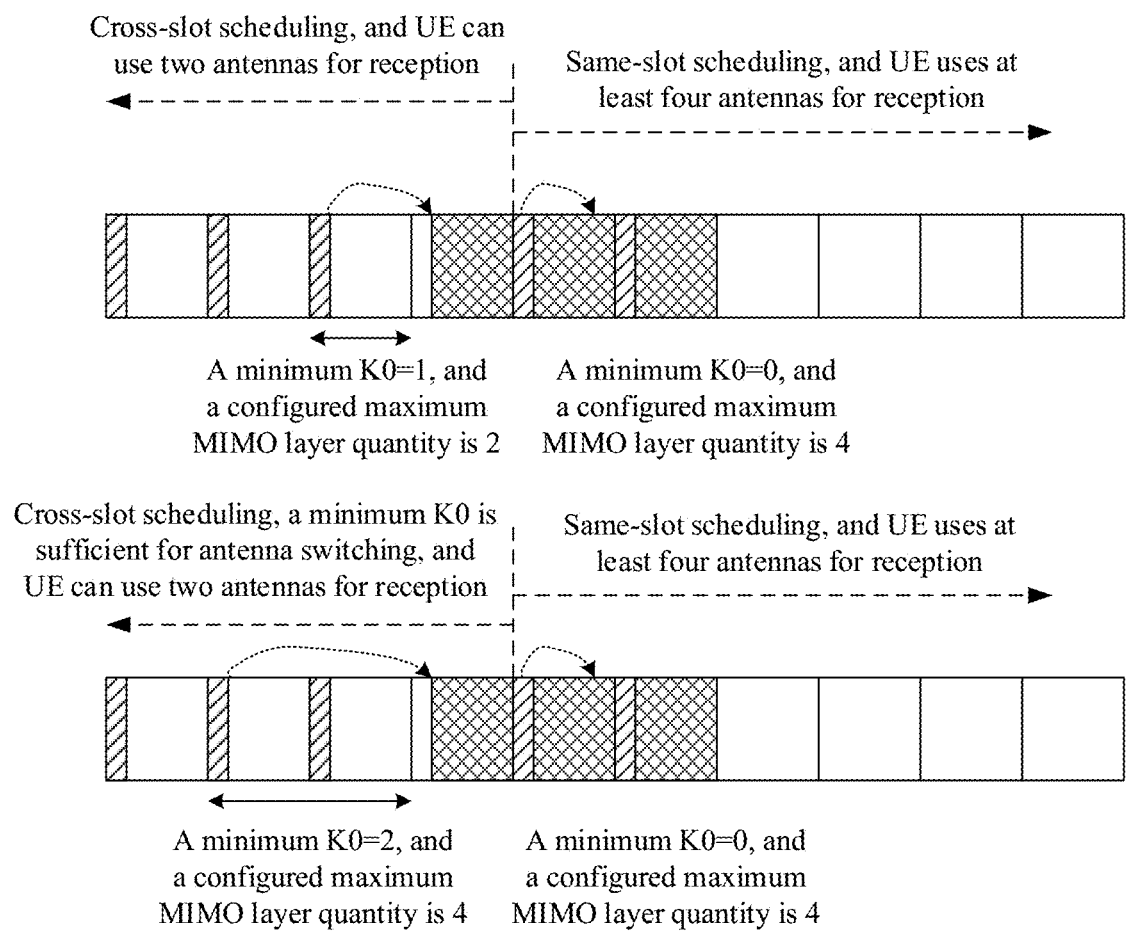
FIG. 7 is a schematic diagram of dynamically adjusting a quantity of antennas by UE according to other embodiments of this application.

An example in which the terminal device determines the quantity of receive antennas based on the first maximum MIMO layer quantity N and the corresponding target minimum K0 is provided by using downlink transmission as an example. FIG. 7 shows an antenna switching process of the terminal device. It should be understood that FIG. 7 is merely an example for description, and should not be considered as a limitation on this application. In FIG. 7, a subcarrier spacing (SCS) is 60 kHz, and antenna switching time Y requires two slots.

If the maximum MIMO layer quantity indicated to the terminal device is 4, and the corresponding target minimum K0 is greater than or equal to Y, the terminal device may receive and/or detect a PDCCH by using only two or fewer antennas, to reduce power consumption of the terminal device. As shown in FIG. 7, minimum K0=2, namely, minimum K0=Y, a configured maximum MIMO layer quantity of the terminal device is 4, cross-slot scheduling is used, and a value of the minimum K0 is sufficient for antenna switching. The terminal device may receive and/or detect a PDCCH by using only two receive antennas, to reduce power consumption of the terminal device.

If the maximum MIMO layer quantity indicated to the terminal device is 2, the terminal device may receive and/or detect a PDCCH by using only two or fewer antennas, regardless of a value of the corresponding target minimum K0. As shown in FIG. 7, when cross-slot scheduling is used, a configured maximum MIMO layer quantity of the terminal device is 2. In this case, a minimum K0 is 1, and the minimum K0 is less than Y. The terminal device may still receive and/or detect a PDCCH by using two antennas, to reduce power consumption of the terminal device.

If the maximum MIMO layer quantity indicated to the terminal device is 4, and the corresponding target minimum K0 is less than Y, the terminal device cannot use two antennas to perform communication. As shown in FIG. 7, minimum K0=0, a configured maximum MIMO layer quantity of the terminal device is 4, minimum K0<Y during same-slot scheduling, and the terminal device receives and/or detects a PDCCH and/or a PDSCH by using at least four receive antennas, to improve transmission rate and reduce communication delay.

Another example in which the terminal device determines the quantity of receive antennas based on the first maximum MIMO layer quantity N and the corresponding target minimum K0 is provided by using a downlink as an example.

If the maximum MIMO layer quantity indicated to the terminal device is 8, and the corresponding target minimum K0 is greater than or equal to Y, the terminal device may receive and/or detect a PDCCH by using only two or fewer antennas, to reduce power consumption of the terminal device.

If the maximum MIMO layer quantity indicated to the terminal device is 2, the terminal device may receive and/or detect a PDCCH by using only two or fewer antennas, regardless of a value of the corresponding target minimum K0, to reduce power consumption of the terminal device.

If the maximum MIMO layer quantity indicated to the terminal device is 8, and the corresponding target minimum K0 is less than Y, the terminal device cannot use two antennas to perform communication, and the terminal device receives a PDCCH and a PDSCH by using at least eight receive antennas, to improve a transmission rate and reduce a communication delay.

Without loss of generality, if the maximum MIMO layer quantity indicated to the terminal device is N, and the corresponding target minimum K0 is greater than or equal to Y, the terminal device may receive and/or detect a PDCCH by using only M antennas, to reduce power consumption of the terminal device (M<N). If the maximum MIMO layer quantity indicated to the terminal device is N, and the corresponding target minimum K0 is less than Y, the terminal device cannot use M antennas to perform communication, where M is a positive integer greater than or equal to 1, and N is a positive integer greater than or equal to 1.

In addition, when scheduling for which the indicated first maximum MIMO layer quantity N is the per-BWP configured maximum MIMO layer quantity or the per-cell configured maximum MIMO layer quantity occurs, a preset timer may be started, and the maximum MIMO layer quantity of the terminal device may remain at the per-BWP configured maximum MIMO layer quantity or the per-cell configured maximum MIMO layer quantity, for example, N=4, until the preset timer expires.

The preset timer is restarted each time scheduling for which a MIMO layer quantity indicated in data scheduling or DCI used for scheduling is the per-BWP configured maximum MIMO layer quantity or the per-cell configured maximum MIMO layer quantity occurs.

After the preset timer expires, the maximum MIMO layer quantity of the terminal device falls back to a BWP configured reduced maximum MIMO layer quantity, and the BWP configured reduced maximum MIMO layer quantity may be denoted as K. K<N, K is an integer greater than or equal to 1, and N is an integer greater than or equal to 1.

According to this solution provided in embodiments of this application, by using the correspondences between the minimum slot offset values and the maximum MIMO layer quantities, the terminal device can switch the maximum MIMO layer quantity while dynamically switching the minimum slot offset value by using the DCI, and the terminal device can further adjust the quantity of antennas used for communication, to reduce the power consumption of the terminal device.

Format 2

Figure 8:
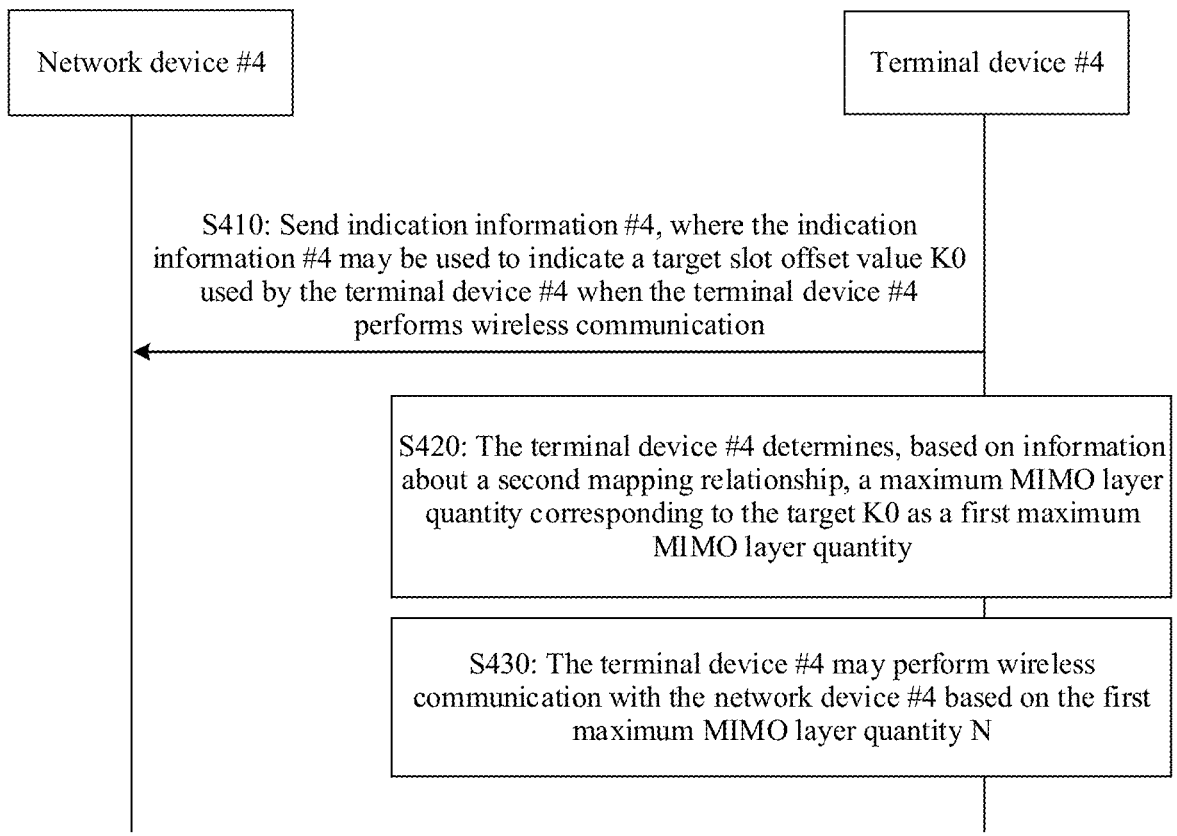
FIG. 8 is a schematic flowchart of a wireless communication method according to other embodiments of this application.

FIG. 8 is a schematic diagram of a wireless communication method 400 according to other embodiments of this application.

A terminal device #4 may send assistance information #4 to a network device #4, where the assistance information #4 is used to determine a second mapping relationship, and information about the second mapping relationship may be used to indicate correspondences between a plurality of slot offset values between a control channel and a data channel and a plurality of maximum MIMO layer quantities, and one slot offset value corresponds to one maximum MIMO layer quantity. The network device #4 may determine the second mapping relationship based on the assistance information #4.

By way of example, and not limitation, the assistance information #4 may include the correspondences between the plurality of slot offset values and the plurality of maximum MIMO layer quantities of the terminal device #4. For example, the terminal device #4 may be UE. The UE reports recommended pairing of K0 and a corresponding maximum MIMO layer quantity by using UE assistance information. The assistance information #4 may further include time Y required by the UE for antenna switching. The network device #4 may configure the second mapping relationship based on a value of Y.

Because the network device #4 does not know time required by the terminal device #4 for antenna switching, the terminal device #4 may send the assistance information #4 in advance, so that the network device #4 determines a more appropriate second mapping relationship. For example, a quantity of antennas for receiving the control channel may be less than a quantity of antennas for receiving (or sending) the data channel, so that power consumption of the terminal device is reduced. It should be noted that the assistance information #4 is not necessarily consistent with the second mapping relationship, that is, the network device #4 does not necessarily determine the second mapping relationship based on the assistance information #4 sent by the terminal device #4. The network device #4 may alternatively determine the second mapping relationship.

By way of example, and not limitation, the network device #4 may configure the second mapping relationship for the terminal device #4 by using signaling. Certainly, the second mapping relationship may alternatively be a first mapping relationship uniformly specified in a protocol.

In S410, the network device #4 may send indication information #4 to the terminal device #4, where the indication information #4 may be used to indicate a target slot offset value K0 indicated by the network device to be used by the terminal device.

S420: The terminal device #4 determines, based on the information about the second mapping relationship, a maximum MIMO layer quantity corresponding to the target slot offset value as a first maximum MIMO layer quantity N, where the information about the second mapping relationship may be used to indicate the correspondences between the plurality of slot offset values between the control channel and the data channel and the plurality of maximum MIMO layer quantities, and one slot offset value corresponds to only one maximum MIMO layer quantity.

To explain and describe the communication method in embodiments of this application in detail, a downlink is used as an example for description, and should not be considered as a limitation on this solution of this application.

For example, a maximum MIMO layer quantity and K0 in cross-slot scheduling may be configured in a binding manner. The network device uses a DCI indication indicating K0 to indicate a change of a corresponding maximum MIMO layer quantity. In the following descriptions, for ease of explanation, an example in which the network device #4 is a base station and the terminal device #4 is UE is used to describe a process in which the network device #4 indicates the change of the maximum MIMO layer quantity of the terminal device #4 in the form 2. Specifically, the base station and the UE may perform the following steps.

Step E-1: The UE may send assistance information #4 to the base station, and the base station determines, based on the assistance information #4, a second mapping relationship in a period in which a same BWP is used.

Step E-2: The base station may configure the second mapping relationship for the UE, to be specific, when configuring different K0 sets in cross-slot scheduling, the base station configures maximum MIMO layer quantities corresponding to the K0 sets; in other words, the maximum MIMO layer quantity and K0 in the cross-slot scheduling are configured in a binding manner.

Without loss of generality, in an example, the base station may configure the second mapping relationship for the UE, and may configure different K0s corresponding to different maximum MIMO layers used by the UE when the UE performs wireless communication. The maximum MIMO layer quantity may be a per-BWP configured maximum MIMO layer quantity configured by the base station for a BWP in which the UE is currently located, or a default per-cell configured maximum MIMO layer quantity configured by the base station for the UE. The base station may configure, by using configuration information, K0 corresponding to the per-BWP configured maximum MIMO layer quantity, and K0 corresponding to the default per-cell configured maximum MIMO layer quantity.

Step E-3: When indicating a target K0 to the UE, the base station simultaneously switches a maximum MIMO layer quantity corresponding to the UE.

Step E-4: The UE determines, based on the information about the second mapping relationship configured in step E-1, a maximum MIMO layer quantity corresponding to the target slot offset value as a first maximum MIMO layer quantity N.

In S430, the terminal device 4 #may perform wireless communication with the network device #4 based on the first maximum MIMO layer quantity N.

The terminal device #4 may determine, based on the first maximum MIMO layer quantity N and the target slot offset value between the control channel and the data channel, a quantity of antennas used for wireless communication, so that a quantity of antennas K for receiving a downlink control channel is less than the quantity of antennas M for receiving (or sending) the data channel. It should be noted that the foregoing manner of determining the quantity of antennas used for wireless communication is not limited to the form 2, and is applicable to the communication method in the embodiments of this application.

For example, an example in which the terminal device determines the quantity of receive antennas based on the first maximum MIMO layer quantity N and the corresponding target K0 is provided by using a downlink as an example. Antenna switching time of the terminal device is Y.

If the maximum MIMO layer quantity indicated to the terminal device is 4, and the corresponding target K0 is greater than or equal to Y, the terminal device may receive and/or detect a PDCCH by using only two or fewer antennas, to reduce power consumption of the terminal device.

If the maximum MIMO layer quantity indicated to the terminal device is 2, the terminal device may receive and/or detect a PDCCH by using only two or fewer antennas, regardless of a value of the corresponding target K0, to reduce power consumption of the terminal device.

If the maximum MIMO layer quantity indicated to the terminal device is 4, and the corresponding target K0 is less than Y, the terminal device cannot use two antennas to perform communication, to improve a transmission rate and reduce a communication delay.

Another example in which the terminal device determines the quantity of receive antennas based on the first maximum MIMO layer quantity N and the corresponding target K0 is provided by using downlink transmission as an example.

If the maximum MIMO layer quantity indicated to the terminal device is 8, and the corresponding target K0 is greater than or equal to Y, the terminal device may receive and/or detect a PDCCH by using only two or fewer antennas, to reduce power consumption of the terminal device.

If the maximum MIMO layer quantity indicated to the terminal device is 2, the terminal device may receive and/or detect a PDCCH by using only two or fewer antennas, regardless of a value of the corresponding target K0, to reduce power consumption of the terminal device.

If the maximum MIMO layer quantity indicated to the terminal device is 8, and the corresponding target K0 is less than Y, the terminal device cannot use two antennas to perform communication, and the terminal device receives a PDCCH and a PDSCH by using at least eight receive antennas, to improve a transmission rate and reduce a communication delay.

Without loss of generality, if the maximum MIMO layer quantity indicated to the terminal device is N, and the corresponding target K0 is greater than or equal to Y, the terminal device may receive and/or detect a PDCCH by using only M antennas, to reduce power consumption of the terminal device (M<N). If the maximum MIMO layer quantity indicated to the terminal device is N, and the corresponding target K0 is less than Y, the terminal device cannot use M antennas to perform communication, where M is an integer greater than or equal to 1, and N is an integer greater than or equal to 1.

In addition, when scheduling for which the indicated first maximum MIMO layer quantity N is the per-BWP configured maximum MIMO layer quantity or the per-cell configured maximum MIMO layer quantity occurs, a preset timer may be started, and the maximum MIMO layer quantity of the terminal device may remain at the per-BWP configured maximum MIMO layer quantity or the per-cell configured maximum MIMO layer quantity, for example, N=4, until the preset timer expires.

The preset timer is restarted each time scheduling for which a MIMO layer quantity indicated in data scheduling or DCI used for scheduling is the per-BWP configured maximum MIMO layer quantity or the per-cell configured maximum MIMO layer quantity occurs.

After the preset timer expires, the maximum MIMO layer quantity of the terminal device falls back to a BWP configured reduced maximum MIMO layer quantity, and the BWP configured reduced maximum MIMO layer quantity may be denoted as K. K<N, K is an integer greater than or equal to 1, and N is an integer greater than or equal to 1.

According to this solution provided in embodiments of this application, by using the correspondences between the slot offset values and the maximum MIMO layer quantities, the terminal device can switch the maximum MIMO layer quantity while dynamically switching the slot offset value by using the DCI, and the terminal device can further adjust the quantity of antennas used for communication, to reduce the power consumption of the terminal device.

Format 3

Figure 9:
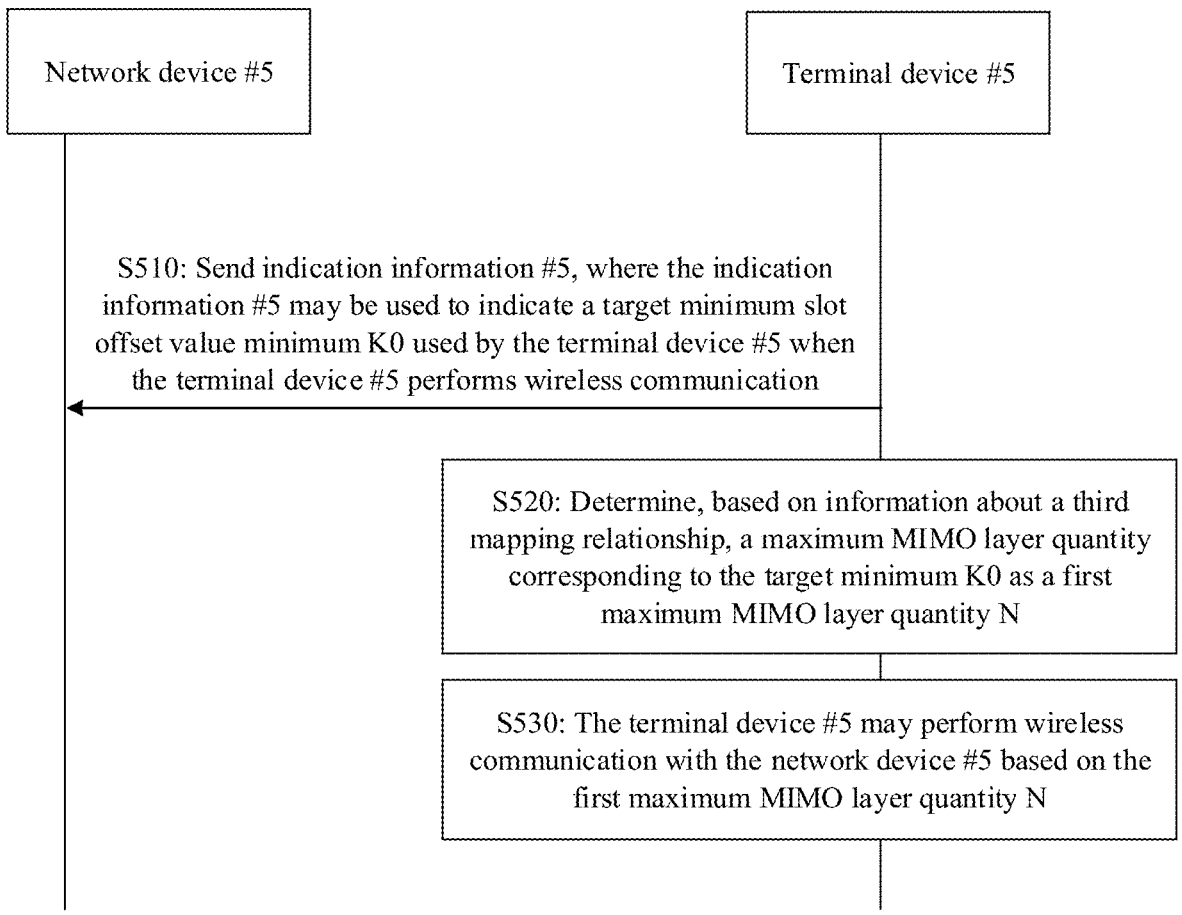
FIG. 9 is a schematic flowchart of a wireless communication method according to other embodiments of this application.

FIG. 9 is a schematic diagram of a wireless communication method 500 according to other embodiments of this application.

A terminal device #5 sends assistance information #5 to a network device #5. The assistance information #5 is used to indicate a third mapping relationship, information about the third mapping relationship may be used to indicate correspondences between a plurality of first size relationships and a plurality of maximum MIMO layer quantities, and the first size relationships include a first size relationship between a first threshold and a minimum slot offset value that is between a control channel and a data channel and that is indicated by the network device. The network device #5 may determine the third mapping relationship based on the assistance information #5. Specifically, the information about the third mapping relationship may include:

If a minimum slot offset value is greater than the first threshold, a maximum MIMO layer quantity corresponding to the minimum slot offset value is a first layer quantity;

if the minimum slot offset value is equal to the first threshold, the maximum MIMO layer quantity corresponding to the minimum slot offset value is a second layer quantity; or if the minimum slot offset value is less than the first threshold, the maximum MIMO layer quantity corresponding to the minimum slot offset value is a third layer quantity.

The first layer quantity may be equal to the second layer quantity and not equal to the third layer quantity; or the second layer quantity may be equal to the third layer quantity and not equal to the first layer quantity; or the first layer quantity, the second layer quantity, and the third layer quantity may be not equal.

Without loss of generality, for example, the first layer quantity may be a per-BWP configured maximum MIMO layer quantity configured by the network device #5 for a BWP in which the terminal device #5 is currently located. The third layer quantity may be a default per-cell configured maximum MIMO layer quantity configured by the network device #5 for the terminal device #5. The second layer quantity may be equal to the first layer quantity or the third layer quantity.

For another example, in the form 3, a specific third mapping relationship may alternatively include (where this is an example in which the first layer quantity is equal to the second layer quantity and is not equal to the third layer quantity):

If a minimum K0 is greater than or equal to the first threshold, a maximum MIMO layer quantity corresponding to the terminal device #5 may be the first layer quantity; for example, the first layer quantity may be a currently-used-BWP configured maximum MIMO layer quantity, for example, 4; or if the minimum K0 is less than the first threshold, the maximum MIMO layer quantity of the terminal device #5 may be the third layer quantity; for example, the third layer quantity may be a currently-used-BWP configured reduced maximum MIMO layer quantity, for example, 2.

By way of example, and not limitation, the assistance information #5 may include correspondences between a plurality of minimum slot offset values and a plurality of maximum MIMO layer quantities of the terminal device #5. For example, the terminal device #5 may report a recommended third mapping relationship. The assistance information #5 may alternatively include the first threshold. For example, the terminal device #5 may be a UE, the UE may report the recommended first threshold by using UE assistance information, and the network device #5 may determine the third mapping relationship based on the first threshold. It should be noted that the assistance information #5 may not necessarily be consistent with the third mapping relationship, that is, the network device #5 does not necessarily determine the third mapping relationship based on the assistance information #5 sent by the terminal device #5. The network device #5 may alternatively determine the third mapping relationship.

By way of example, and not limitation, the network device #5 may configure the third mapping relationship for the terminal device #5 by using signaling. Certainly, the third mapping relationship may alternatively be a third mapping relationship uniformly specified in a protocol. Alternatively, the first threshold may be a first threshold uniformly specified in a protocol, for example, minimum time is switched by directly multiplexing the minimum K0 in cross-slot scheduling.

In S510, the network device #5 may send indication information #5 to the terminal device #5, where the indication information #5 may be used to indicate a target minimum slot offset value minimum K0 used by the terminal device #5 when the terminal device #5 performs wireless communication.

In S520, the terminal device #5 determines, based on the information about the third mapping relationship, a maximum MIMO layer quantity corresponding to the target minimum slot offset value minimum K0 as a first maximum MIMO layer quantity N.

In S530, the terminal device #5 may perform wireless communication with the network device #5 based on the first maximum MIMO layer quantity N.

The terminal device may also determine a quantity of receive antennas or a quantity of transmit antennas based on the first maximum MIMO layer quantity N and the target minimum slot offset value between the control channel and the data channel. The determining method is described in the form 1, and details are not described herein again.

In addition, when scheduling for which the indicated first maximum MIMO layer quantity N is the per-BWP configured maximum MIMO layer quantity or the per-cell configured maximum MIMO layer quantity occurs, a preset timer may be started, and the maximum MIMO layer quantity of the terminal device may remain at the per-BWP configured maximum MIMO layer quantity or the per-cell configured maximum MIMO layer quantity, for example, N=4, until the preset timer expires.

The preset timer is restarted each time scheduling for which a MIMO layer quantity indicated in data scheduling or DCI used for scheduling is the per-BWP configured maximum MIMO layer quantity or the per-cell configured maximum MIMO layer quantity occurs.

After the preset timer expires, the maximum MIMO layer quantity of the terminal device falls back to the BWP configured reduced maximum MIMO layer quantity, and the BWP configured reduced maximum MIMO layer quantity may be denoted as K. K<N, K is a positive integer greater than or equal to 1, and N is a positive integer greater than or equal to 1.

According to this solution provided in embodiments of this application, by using the correspondences between the minimum slot offset values and the maximum MIMO layer quantities, the terminal device can switch the maximum MIMO layer quantity while dynamically switching the minimum slot offset value by using the DCI, and the terminal device can further adjust the quantity of antennas used for communication, to reduce power consumption of the terminal device.

Format 4

Figure 10:
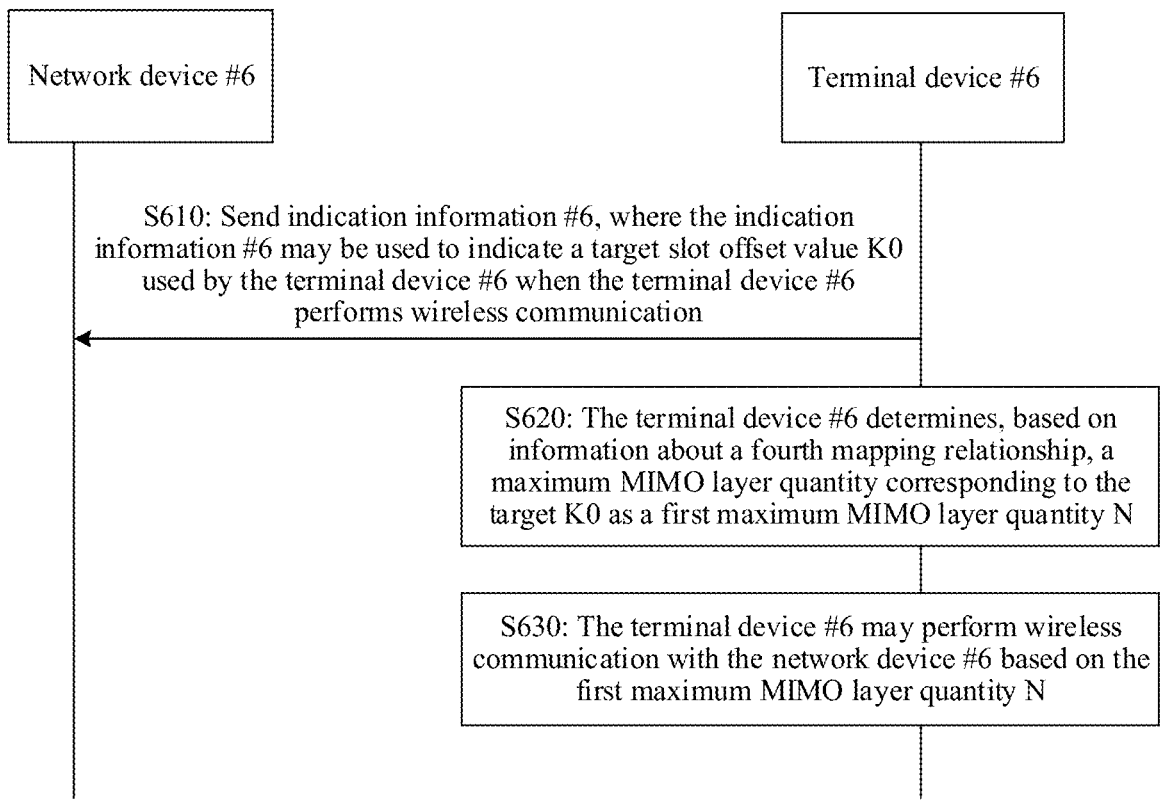
FIG. 10 is a schematic flowchart of a wireless communication method according to other embodiments of this application.

FIG. 10 is a schematic diagram of a wireless communication method 600 according to other embodiments of this application.

A terminal device #6 sends assistance information #6 to a network device #6. The assistance information #6 is used to indicate a fourth mapping relationship, information about the fourth mapping relationship is used to indicate correspondences between a plurality of second size relationships and a plurality of maximum MIMO layer quantities, and the second size relationship includes a second size relationship between a second threshold and a slot offset value that is between a control channel and a data channel and that is indicated by the network device. The network device #6 may determine the fourth mapping relationship based on the assistance information #6.

Specifically, the information about the fourth mapping relationship may include:

If a slot offset value is greater than the second threshold, a maximum MIMO layer quantity corresponding to the slot offset value is a fourth layer quantity; if the slot offset value is equal to the second threshold, the maximum MIMO layer quantity corresponding to the slot offset value is a fifth layer quantity; or if the slot offset value is less than the second threshold, the maximum MIMO layer quantity corresponding to the slot offset value is a sixth layer quantity. The fourth layer quantity may be equal to the fifth layer quantity and not equal to the sixth layer quantity. The fifth layer quantity may be equal to the sixth layer quantity and not equal to the fourth layer quantity. The fourth layer quantity, the fifth layer quantity, and the sixth layer quantity may be not equal.

Without loss of generality, for example, the fourth layer quantity may be a per-BWP configured maximum MIMO layer quantity configured by the network device #6 for a BWP in which the terminal device #6 is currently located. The sixth layer quantity may be a default per-cell configured maximum MIMO layer quantity configured by the network device #6 for the terminal device #6. The fifth layer quantity may be equal to the fourth layer quantity or the sixth layer quantity.

For another example, in the form 4, a specific fourth mapping relationship may alternatively include (where this is an example in which the fourth layer quantity is equal to the fifth layer quantity and is not equal to the sixth layer quantity):

If K0 is greater than or equal to the second threshold, a maximum MIMO layer quantity corresponding to the terminal device #6 may be the fourth layer quantity; for example, the fourth layer quantity may be a currently-used-BWP configured maximum MIMO layer quantity, for example, 4; or if K0 is less than the second threshold, the maximum MIMO layer quantity of the terminal device #6 may be the sixth layer quantity; for example, the sixth layer quantity may be a currently-used-BWP configured reduced maximum MIMO layer quantity (BWP configured reduced maximum MIMO layer), for example, 2.

By way of example, and not limitation, the assistance information #6 may include correspondences between a plurality of slot offset values and a plurality of maximum MIMO layer quantities of the terminal device #6. For example, the terminal device #6 may report a recommended fourth mapping relationship. The assistance information #6 may alternatively include the second threshold. For example, the terminal device #6 may be UE, the UE may report the recommended second threshold by using UE assistance information, and the network device #6 may determine the fourth mapping relationship based on a value of the second threshold. It should be noted that the assistance information #6 is not necessarily consistent with the fourth mapping relationship, that is, the network device #6 does not necessarily determine the fourth mapping relationship based on the assistance information #6 sent by the terminal device #6. The network device #6 may alternatively determine the fourth mapping relationship.

By way of example, and not limitation, the network device #6 may configure the fourth mapping relationship for the terminal device #6 by using signaling. Certainly, the fourth mapping relationship may alternatively be a fourth mapping relationship uniformly specified in a protocol. The second threshold may alternatively be a second threshold uniformly specified in a protocol.

In S610, the network device #6 may send indication information #6 to the terminal device #6, where the indication information #6 may be used to indicate a target slot offset value K0 to be used by the terminal device #6 when the terminal device #6 performs wireless communication.

In S620, the terminal device #6 determines, based on the information about the fourth mapping relationship, a maximum MIMO layer quantity corresponding to the target slot offset value K0 as a first maximum MIMO layer quantity N.

In embodiments of this application, a downlink is used as an example for description, and should not be considered as a limitation on these solutions of this application.

In the following descriptions, for ease of explanation, an example in which the network device #6 is a base station and the terminal device #6 is UE is used to describe a process in which the network device #6 indicates a change of the maximum MIMO layer quantity of the terminal device #6 in the form 4. Specifically, the base station and the UE may perform the following steps.

If K0 of a time domain resource allocation (TDRA) field in DCI used for scheduling is less than the second threshold, a first maximum MIMO layer quantity of a PDSCH or a PUSCH scheduled by using the DCI for the UE is the sixth layer quantity. For example, the sixth layer quantity may be a currently-used-BWP configured reduced maximum MIMO layer quantity, for example, 2.

If K0 corresponding to a TDRA field in DCI used for scheduling is greater than or equal to the second threshold, a first maximum MIMO layer quantity of a PDSCH or a PUSCH scheduled by using the DCI for the UE is the fourth layer quantity. For example, the fourth layer quantity may be a currently-used-BWP configured maximum MIMO layer quantity, for example, 4.

In S630, the terminal device #6 may perform wireless communication with the network device #6 based on the first maximum MIMO layer quantity N.

The terminal device #6 may also determine a quantity of receive antennas or a quantity of transmit antennas based on the first maximum MIMO layer quantity N and the target slot offset value between the control channel and the data channel. The determining method is described in the form 2, and details are not described herein again.

In addition, when scheduling for which the indicated first maximum MIMO layer quantity N is the BWP configured maximum MIMO layer quantity or the per-cell configured maximum MIMO layer quantity occurs, a preset timer may be started, and the maximum MIMO layer quantity of the terminal device may remain at the BWP configured maximum MIMO layer quantity or the per-cell configured maximum MIMO layer quantity, for example, N=4, until the preset timer expires.

The preset timer is restarted each time scheduling for which a MIMO layer quantity indicated in data scheduling or DCI used for scheduling is the BWP configured maximum MIMO layer quantity or the per-cell configured maximum MIMO layer quantity occurs.

After the preset timer expires, the maximum MIMO layer quantity of the terminal device falls back to a BWP configured reduced maximum MIMO layer quantity, and the BWP configured reduced maximum MIMO layer quantity may be denoted as K. $K<N$, K is a positive integer greater than or equal to 1, and N is a positive integer greater than or equal to 1.

According to this solution in embodiments of this application, maximum MIMO layer quantity switching based on BWP switching may coexist with maximum MIMO layer quantity switching combined with cross-slot scheduling.

According to this solution provided in embodiments of this application, by using the correspondences between the slot offset values and the maximum MIMO layer quantities, the terminal device can switch the maximum MIMO layer quantity while dynamically switching the minimum slot offset value by using the DCI, and the terminal device can further adjust the quantity of antennas used for communication, to reduce power consumption of the terminal device.

Figure 11:
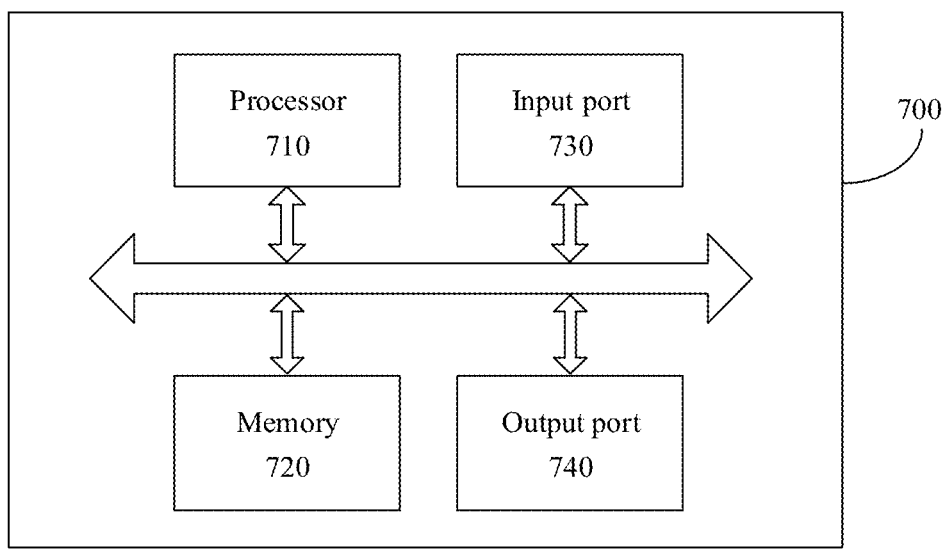
FIG. 11 is a schematic block diagram of a wireless communication apparatus according to embodiments of this application.

According to the foregoing method, FIG. 11 is a schematic diagram of a wireless communication apparatus 700 according to embodiments of this application.

The apparatus 700 may be a terminal device, or may be a chip or a circuit, for example, a chip or a circuit that may be disposed in the terminal device.

The apparatus 700 may include a processing unit 710 (that is, an example of the processing unit) and a storage unit 720. The storage unit 720 is configured to store instructions.

The processing unit 710 is configured to execute the instructions stored in the storage unit 720, so that the apparatus 700 implements the steps performed by the terminal device (for example, any one of the terminal device #1 to the terminal device #6) in the foregoing methods.

Further, the apparatus 700 may further include an input port 730 and an output port 740. Further, the processing unit 710, the storage unit 720, the input port 730, and the output port 740 may communicate with each other through an internal connection path, to transmit a control signal and/or a data signal. The storage unit 720 is configured to store a computer program. The processing unit 710 may be configured to invoke the computer program from the storage unit 720 and run the computer program, to control the input port 730 to receive a signal, and control the output port 740 to send a signal, to complete the steps performed by the terminal device in the foregoing methods. The storage unit 720 may be integrated into the processing unit 710, or may be disposed separately from the processing unit 710.

Optionally, if the apparatus 700 is a communication device (for example, a terminal device), the input port 730 is a receiver, and the output port 740 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 700 is a chip or a circuit, the input port 730 is an input interface and the output port 740 is an output interface.

In an implementation, it may be considered that functions of the input port 730 and the output port 740 are implemented by using a transceiver circuit or a dedicated transceiver chip. It may be considered that the processing unit 710 may be implemented by using a dedicated processing chip, a processing circuit, a processing unit, or a general-purpose chip.

In another implementation, it may be considered that a communication device (for example, a network device or a terminal device) provided in embodiments of this application is implemented by using a general-purpose computer. To be specific, program code for implementing functions of the processing unit 710, the input port 730, and the output port 740 is stored in the storage unit 720, and a general-purpose processing unit implements the functions of the processing unit 710, the input port 730, and the output port 740 by executing the code in the storage unit 720.

In an implementation, the processing unit 710 is configured to control the input port 730 to receive first indication information from a network device, where the first indication information is used to indicate a first maximum multiple-input multiple-output (MIMO) layer quantity N used by the terminal device to perform wireless communication, and N is an integer greater than or equal to 1; and the processing unit 710 is configured to perform wireless communication with the network device based on the first maximum MIMO layer quantity N.

Optionally, the first indication information is carried in DCI.

Optionally, the first indication information is carried in a first field of the DCI, and the first indication information indicates an index value corresponding to a maximum MIMO layer quantity configured by the network device. A length of the DCI to which the first field is added is longer than a length of the original DCI without the first field.

Optionally, the first indication information includes a target minimum slot offset value that is indicated by the network device to be used by the terminal device; and the processing unit 710 is configured to determine, based on information about a first mapping relationship, a maximum MIMO layer quantity corresponding to the target minimum slot offset value as the first maximum MIMO layer quantity N, where the information about the first mapping relationship is used to indicate correspondences between a plurality of minimum slot offset values between a control channel and a data channel and a plurality of maximum MIMO layer quantities, and one minimum slot offset value corresponds to one maximum MIMO layer quantity.

Optionally, the information about the first mapping relationship is a first mapping relationship configured by the network device for the terminal device.

Optionally, the information about the first mapping relationship is a first mapping relationship specified in a protocol.

Optionally, the output port 740 is configured to send first assistance information to the network device, where the first assistance information is used to determine the information about the first mapping relationship.

Optionally, the first indication information includes a target slot offset value that is indicated by the network device to be used by the terminal device; and the processing unit 710 is configured to determine, based on information about a second mapping relationship, a maximum MIMO layer quantity corresponding to the target slot offset value as the first maximum MIMO layer quantity N, where the information about the second mapping relationship is used to indicate correspondences between a plurality of slot offset values between a control channel and a data channel and a plurality of maximum MIMO layer quantities, and one slot offset value corresponds to one maximum MIMO layer quantity.

Optionally, the information about the second mapping relationship is a second mapping relationship configured by the network device for the terminal device.

Optionally, the information about the second mapping relationship is a second mapping relationship specified in a protocol.

Optionally, the output port 740 is configured to send second assistance information to the network device, where the second assistance information is used to determine the information about the second mapping relationship.

Optionally, the first indication information includes a target minimum slot offset value that is indicated by the network device to be used by the terminal device; and the processing unit 710 is configured to determine, based on information about a third mapping relationship, a maximum MIMO layer quantity corresponding to the target minimum slot offset value as the first maximum MIMO layer quantity N. The information about the third mapping relationship includes: If a minimum slot offset value is greater than a first threshold, a maximum MIMO layer quantity corresponding to the minimum slot offset value is a first layer quantity; if the minimum slot offset value is equal to the first threshold, the maximum MIMO layer quantity corresponding to the minimum slot offset value is a second layer quantity; or if the minimum slot offset value is less than the first threshold, the maximum MIMO layer quantity corresponding to the minimum slot offset value is a third layer quantity.

Optionally, the information about the third mapping relationship is a third mapping relationship configured by the network device for the terminal device.

Optionally, the information about the third mapping relationship is a third mapping relationship specified in a protocol.

Optionally, the output port 740 is configured to send third assistance information to the network device, where the third assistance information is used to determine the information about the third mapping relationship.

Optionally, the first indication information includes a target slot offset value that is indicated by the network device to be used by the terminal device; and the processing unit 710 is configured to determine, based on information about a fourth mapping relationship, a maximum MIMO layer quantity corresponding to the target slot offset value as the first maximum MIMO layer quantity N, where the information about the fourth mapping relationship includes: If a slot offset value is greater than a second threshold, a maximum MIMO layer quantity corresponding to the slot offset value is a fourth layer quantity; if the slot offset value is equal to the second threshold, the maximum MIMO layer quantity corresponding to the slot offset value is a fifth layer quantity; or if the slot offset value is less than the second threshold, the maximum MIMO layer quantity corresponding to the slot offset value is a sixth layer quantity.

Optionally, the information about the fourth mapping relationship is a fourth mapping relationship configured by the network device for the terminal device.

Optionally, the output port 740 is configured to send fourth assistance information to the network device, where the fourth assistance information is used to determine the information about the fourth mapping relationship.

Optionally, the processing unit 710 is configured to determine a quantity of receive antennas or a quantity of transmit antennas based on the first maximum MIMO layer quantity N.

Optionally, the processing unit 710 is configured to determine a quantity of receive antennas or a quantity of transmit antennas based on the first maximum MIMO layer quantity N and the target minimum slot offset value between the control channel and the data channel.

Optionally, the processing unit 710 is configured to determine a quantity of receive antennas or a quantity of transmit antennas based on the first maximum MIMO layer quantity N and the target slot offset value between the control channel and the data channel.

The foregoing listed functions and actions of the modules or units in the apparatus 700 are merely examples for description. The apparatus 700 is configured in the terminal device or is the terminal device. The modules or units in the apparatus 700 may be configured to perform the actions or the processing processes performed by the terminal device (for example, any one of the terminal device #1 to the terminal device #6) in the foregoing methods. To avoid repetition, detailed descriptions are omitted.

For concepts, explanations, detailed descriptions, and other steps of the apparatus 700 that are related to the technical solutions provided in embodiments of this application, refer to the descriptions of the content in the foregoing methods or other embodiments. Details are not described herein again.

Figure 12:
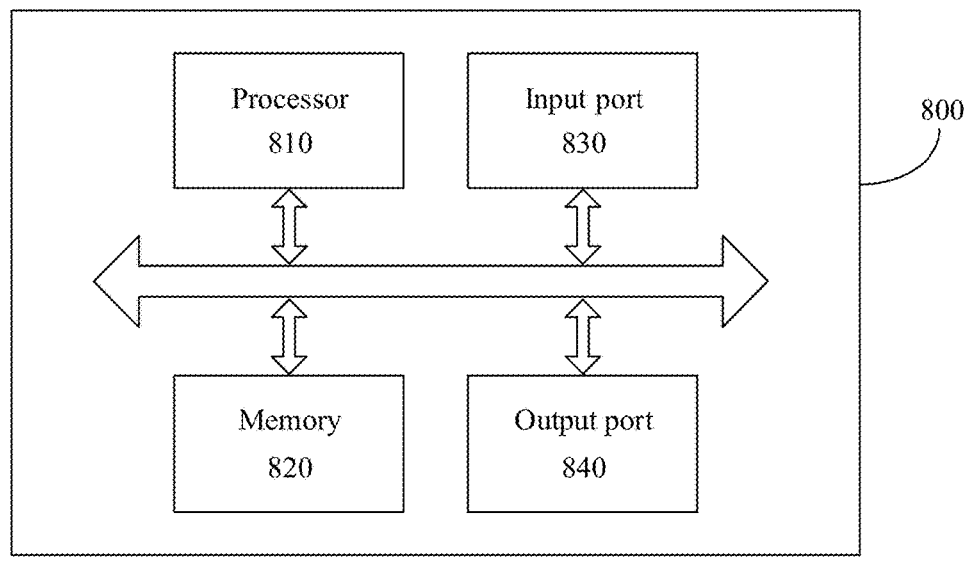
FIG. 12 is a schematic block diagram of a wireless communication apparatus according to other embodiments of this application.

According to the foregoing method, FIG. 12 is a schematic diagram of a wireless communication apparatus 800 according to embodiments of this application.

The apparatus 800 may be a network device (for example, any one of the network device #1 to the network device #6) or may be a chip or a circuit, for example, a chip or a circuit that may be disposed in the network device.

The apparatus 800 may include a processing unit 810 (that is, an example of the processing unit) and a storage unit 820. The storage unit 820 is configured to store instructions.

The processing unit 810 is configured to execute the instructions stored in the storage unit 820, so that the apparatus 800 implements the steps performed by the network device in the foregoing methods.

Further, the apparatus 800 may further include an input port 830 and an output port 840. Further, the processing unit 810, the storage unit 820, the input port 830, and the output port 840 may communicate with each other through an internal connection path, to transmit a control signal and/or a data signal. The storage unit 820 is configured to store a computer program. The processing unit 810 may be configured to invoke the computer program from the storage unit 820 and run the computer program, to control the input port 830 to receive a signal, and control the output port 840 to send a signal, to complete the steps performed by the network device in the foregoing methods. The storage unit 820 may be integrated into the processing unit 810, or may be disposed separately from the processing unit 810.

Optionally, if the apparatus 800 is a communication device (for example, a network device), the input port 830 is a receiver, and the output port 840 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 800 is the chip or the circuit, the input port 830 is an input interface and the output port 840 is an output interface.

In an implementation, it may be considered that functions of the input port 830 and the output port 840 are implemented by using a transceiver circuit or a dedicated transceiver chip. It may be considered that the processing unit 810 may be implemented by using a dedicated processing chip, a processing circuit, a processing unit, or a general-purpose chip.

In another implementation, it may be considered that a communication device (for example, a network device) provided in embodiments of this application is implemented by using a general-purpose computer. To be specific, program code for implementing functions of the processing unit 810, the input port 830, and the output port 840 is stored in the storage unit 820, and a general-purpose processing unit implements the functions of the processing unit 810, the input port 830, and the output port 840 by executing the code in the storage unit 820.

In an implementation, the processing unit 810 is configured to control the output port 840 to send first indication information to a terminal device, where the first indication information is used to indicate a first maximum multiple-input multiple-output (MIMO) layer quantity N used by the terminal device to perform wireless communication, and N is an integer greater than or equal to 1; and the processing unit 810 is configured to perform wireless communication with the terminal device based on the first maximum MIMO layer quantity N.

Optionally, the first indication information is carried in DCI.

Optionally, the first indication information is carried in a first field of the DCI, and the first indication information indicates an index value corresponding to a maximum MIMO layer quantity configured by the network device. A length of the DCI to which the first field is added is longer than a length of the original DCI without the first field.

Optionally, the first indication information includes a target minimum slot offset value that is indicated by the network device to be used by the terminal device; and the first maximum MIMO layer quantity N is a maximum MIMO layer quantity that corresponds to the target minimum slot offset value and that is indicated by a first mapping relationship, information about the first mapping relationship is used to indicate correspondences between a plurality of minimum slot offset values between a control channel and a data channel and a plurality of maximum MIMO layer quantities, and one minimum slot offset value corresponds to one maximum MIMO layer quantity.

Optionally, the information about the first mapping relationship is a first mapping relationship configured by the network device for the terminal device.

Optionally, the information about the first mapping relationship is a first mapping relationship specified in a protocol.

Optionally, the input port 830 is configured to receive first assistance information from the terminal device, where the first assistance information is used to determine the information about the first mapping relationship.

Optionally, the first indication information includes a target slot offset value that is indicated by the network device to be used by the terminal device; and the first maximum MIMO layer quantity N is a maximum MIMO layer quantity that corresponds to the target slot offset value and that is indicated by a second mapping relationship, information about the second mapping relationship is used to indicate correspondences between a plurality of slot offset values between a control channel and a data channel and a plurality of maximum MIMO layer quantities, and one slot offset value corresponds to one maximum MIMO layer quantity.

Optionally, the information about the second mapping relationship is a second mapping relationship configured by the network device for the terminal device.

Optionally, the information about the second mapping relationship is a second mapping relationship specified in a protocol.

Optionally, the input port 830 is configured to receive second assistance information from the terminal device, where the second assistance information is used to determine the information about the second mapping relationship.

Optionally, the first indication information includes a target minimum slot offset value that is indicated by the network device to be used by the terminal device; and the first maximum MIMO layer quantity N is a maximum MIMO layer quantity that corresponds to the target minimum slot offset value and that is indicated by a third mapping relationship, and information about the third mapping relationship includes: if a minimum slot offset value is greater than a first threshold, a maximum MIMO layer quantity corresponding to the minimum slot offset value is a first layer quantity; if the minimum slot offset value is equal to the first threshold, the maximum MIMO layer quantity corresponding to the minimum slot offset value is a second layer quantity; or if the minimum slot offset value is less than the first threshold, the maximum MIMO layer quantity corresponding to the minimum slot offset value is a third layer quantity.

Optionally, the information about the third mapping relationship is a third mapping relationship configured by the network device for the terminal device.

Optionally, the information about the third mapping relationship is a third mapping relationship specified in a protocol.

Optionally, the input port 830 receives third assistance information from the terminal device, where the third assistance information is used to determine the information about the third mapping relationship.

Optionally, the first indication information includes a target slot offset value that is indicated by the network device to be used by the terminal device; and the first maximum MIMO layer quantity N is a maximum MIMO layer quantity that corresponds to the target slot offset value and that is indicated by a fourth mapping relationship, and information about the fourth mapping relationship includes: if a slot offset value is greater than a second threshold, a maximum MIMO layer quantity corresponding to the slot offset value is a fourth layer quantity; if the slot offset value is equal to the second threshold, the maximum MIMO layer quantity corresponding to the slot offset value is a fifth layer quantity; or if the slot offset value is less than the second threshold, the maximum MIMO layer quantity corresponding to the slot offset value is a sixth layer quantity.

Optionally, the information about the fourth mapping relationship is a fourth mapping relationship configured by the network device for the terminal device.

Optionally, the information about the fourth mapping relationship is a fourth mapping relationship specified in a protocol.

Optionally, the input port 830 is configured to receive fourth assistance information from the terminal device, where the fourth assistance information is used to determine the information about the fourth mapping relationship.

Optionally, the maximum MIMO layer quantity includes a maximum uplink MIMO layer quantity and/or a maximum downlink MIMO layer quantity.

The foregoing listed functions and actions of the modules or units in the apparatus 800 are merely examples for description. The apparatus 800 is configured in the network device or is the network device. The modules or units in the apparatus 800 may be configured to perform the actions or the processing processes performed by the access device (for example, any one of the network device #1 to the network device #6) in the foregoing methods. To avoid repetition, detailed descriptions are omitted herein.

For concepts, explanations, detailed descriptions, and other steps of the apparatus 800 that are related to the technical solutions provided in embodiments of this application, refer to the descriptions of the content in the foregoing methods or other embodiments. Details are not described herein again.

Figure 13:
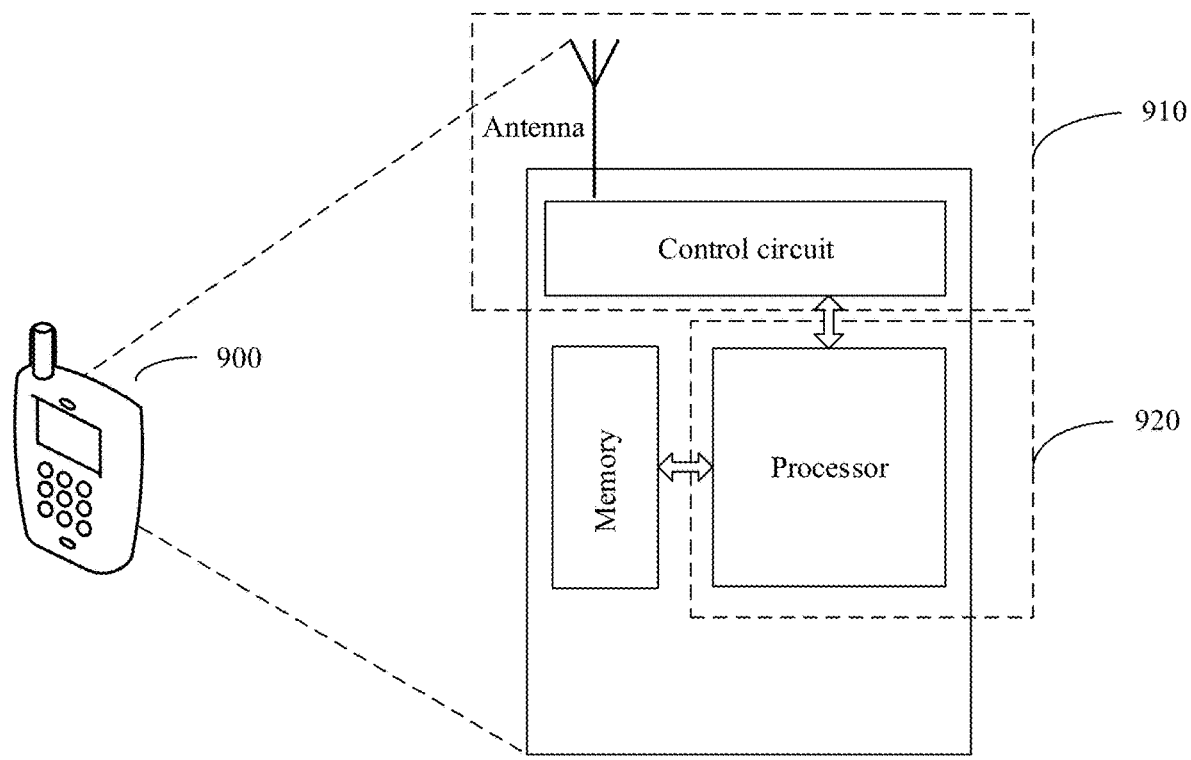
FIG. 13 is a schematic diagram of a structure of a terminal device according to embodiments of this application.

FIG. 13 is a schematic diagram of a structure of a terminal device 900 according to other embodiments of this application. The apparatus 700 may be configured in the terminal device 900, or the apparatus 700 may be the terminal device 900. In other words, the terminal device 900 may perform the action performed by the terminal device in the method 100, 200, 300, 400, or 500.

For ease of description, FIG. 13 shows only main components of the terminal device. As shown in FIG. 13, the terminal device 900 includes a processor, a memory, a control circuit, and an antenna.

The processor is mainly configured to: process a communication protocol and communication data, control the entire terminal device, execute a software program, and process data of the software program. The memory is mainly configured to store the software program and the data. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave.

After the terminal device is powered on, the processor may read a software program in a storage unit, explain and execute instructions of the software program, and process data of the software program. When data needs to be sent in a wireless manner, after the processor performs baseband processing on the to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. In an actual terminal device, there may be a plurality of processors and a plurality of memories. The memory may also be referred to as a storage medium, a storage device, or the like. This is not limited to the embodiments of this application.

For example, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 13 integrates functions of the baseband processor and the central processing unit. A person skilled in the art may understand that the baseband processor and the central processing unit may alternatively be independent processors, and are interconnected by using technologies such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in embodiments of this application, the antenna and the control circuit that have sending and receiving functions may be considered as a transceiver unit 910 of the terminal device 900, and the processor having a processing function may be considered as a processing unit 920 of the terminal device 900. As shown in FIG. 13, the terminal device 900 includes the transceiver unit 910 and the processing unit 920. The transceiver unit may also be referred to as a transceiver, a transceiver machine, a transceiver apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 14:
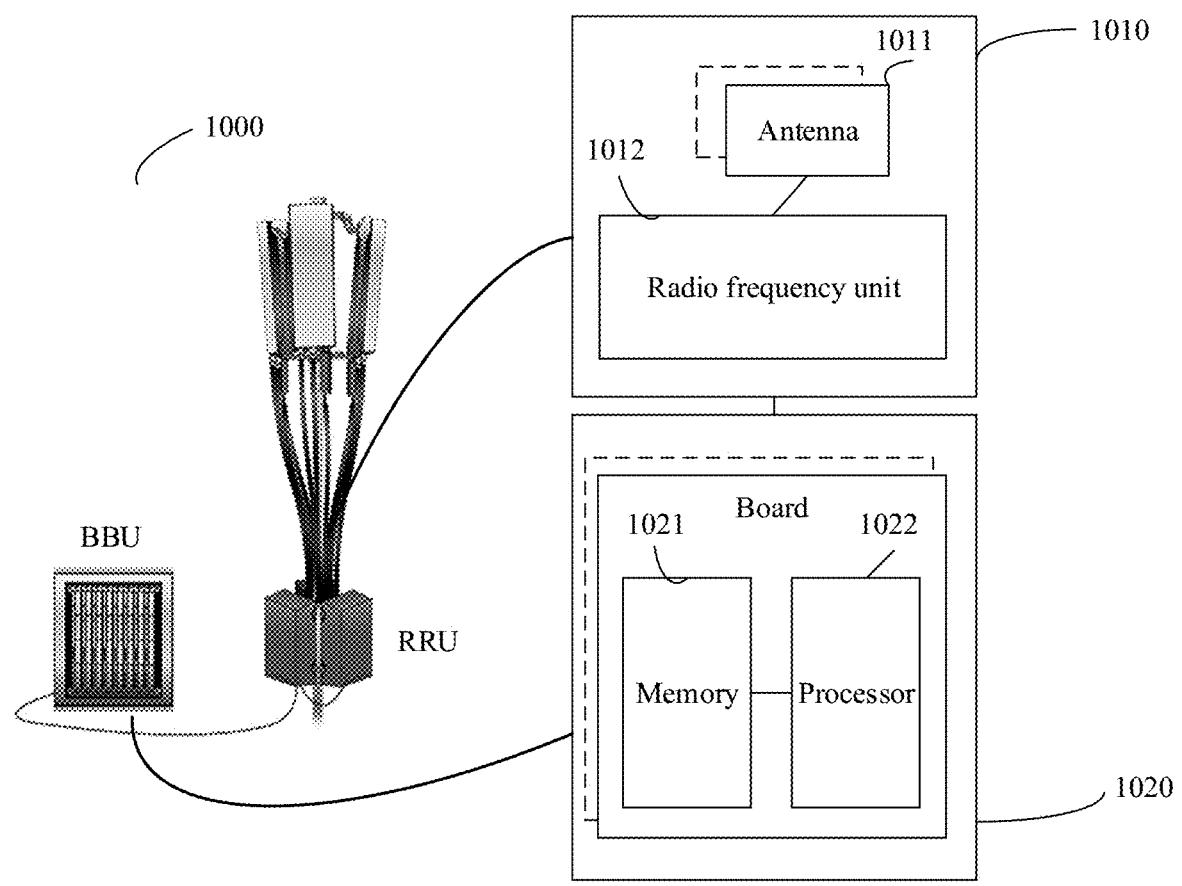
FIG. 14 is a schematic diagram of a structure of a network device according to embodiments of this application.

FIG. 14 is a schematic diagram of a structure of a network device 1000 according to embodiments of this application. The network device 1000 may be configured to implement a function of the network device (for example, any one of the network device #1 to the network device #6) in the foregoing methods. The network device 1000 includes one or more radio frequency units such as a remote radio unit (RRU) 1010 and one or more baseband units (BBU) 1020 (where the baseband unit may also be referred to as a digital unit, digital unit, DU). The RRU 1010 may be referred to as a transceiver unit, a transceiver machine, a transceiver circuit, a transceiver, or the like, and may include at least one antenna 1011 and a radio frequency unit 1012. The RRU

1010 is mainly configured to: send and receive a radio frequency signal and perform conversion between a radio frequency signal and a baseband signal, for example, configured to send the signaling message in the foregoing embodiments to a terminal device. The BBU 1020 is mainly configured to perform baseband processing, control a base station, and so on. The RRU 1010 and the BBU 1020 may be physically disposed together, or may be physically disposed separately, to be specific, distributed base stations.

The BBU 1020 is a control center of the base station, may also be referred to as a processing unit, and is mainly configured to implement a baseband processing function, for example, channel coding, multiplexing, modulation, and spectrum spreading. For example, the BBU (the processing unit) 1020 may be configured to control the base station to perform the operation procedure related to the network device in the foregoing method embodiments.

In an example, the BBU 1020 may include one or more boards, and a plurality of boards may jointly support a radio access network (such as an LTE system or a 5G system) of a single access standard, or may separately support radio access networks of different access standards. The BBU 1020 further includes a memory 1021 and a processor 1022. The memory 1021 is configured to store necessary instructions and data. The processor 1022 is configured to control the base station to perform a necessary action, for example, is configured to control the base station to perform the operation procedure related to the network device in the foregoing method embodiments. The memory 1021 and the processor 1022 may serve one or more boards. In other words, a memory and a processor may be independently disposed on each board, or a plurality of boards may share a same memory and a same processor. In addition, a necessary circuit may further be disposed on each board.

In a possible implementation, with development of a system-on-a-chip (system-on-chip, SoC) technology, all or some functions of the BBU 1020 and the RRU 1010 may be implemented by using the SoC technology, for example, implemented by using a base station function chip. The base station function chip integrates components such as a processor, a memory, and an antenna interface. A program of a base station—related function is stored in the memory. The processor executes the program to implement the base station—related function. Optionally, the base station function chip can also read an external memory of the chip, to implement a related function of the base station.

It should be understood that the structure of the network device shown in FIG. 14 is merely a possible form, and should not constitute any limitation on the embodiments of this application. The embodiments of this application does not exclude a possibility of a base station structure in another form that may appear in the future.

According to the method provided in the embodiments of this application, embodiments of this application further provides a communication system, including the foregoing network device and one or more terminal devices.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor, or the like.

It may be further understood that the memory in the embodiments of this application may be a volatile memory or a nonvolatile memory, or may include a volatile memory and a nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitative descriptions, random access memories (RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions or computer programs. When the program instructions or the computer programs are loaded and executed on a computer, all or some of the procedures or functions according to the embodiments of this application are generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the term "at least one of" or "at least one type of" or similar expressions herein indicates any combination of listed items, for example, at least one of A, B, and C (or at least one of A, B or C) may indicate that only A exists, only B exists, only C exists, both A and B exist, both A and C exist, both B and C exist, and both A, B, and C exist. In addition, the character "/" in this specification usually indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. A person skilled in the art may clearly understand that, for the purpose of convenient and brief description, for detailed working processes of the foregoing system, apparatus, and unit, refer to corresponding processes in the foregoing method embodiments. Details are not described herein again. In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in the embodiments. In addition, functional units in the embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   receiving, by a terminal device, first indication information from a network device,
   wherein the first indication information is used to indicate a first maximum multiple-input multiple-output (MIMO) layer quantity N used by the terminal device to perform wireless communication, and N is an integer greater than or equal to 1; and
   performing, by the terminal device, wireless communication with the network device based on the first maximum MIMO layer quantity N, wherein:
   the first indication information comprises a target minimum slot offset value that is indicated by the network device to be used by the terminal device, and the method further comprises:
      determining, by the terminal device based on a first mapping relationship, a maximum MIMO layer quantity corresponding to the target minimum slot offset value as the first maximum MIMO layer quantity N, wherein the first mapping relationship indicates correspondences between a plurality of minimum slot offset values between a control channel and a data channel and a plurality of maximum MIMO layer quantities, and one minimum slot offset value of the plurality of minimum slot offset values corresponds to one maximum MIMO layer quantity of the plurality of maximum MIMO layer quantities; or
   the first indication information comprises a target slot offset value that is indicated by the network device to be used by the terminal device, and the method further comprises:
      determining, by the terminal device based on a second mapping relationship, a maximum MIMO layer quantity corresponding to the target slot offset value as the first maximum MIMO layer quantity N, wherein the second mapping relationship indicates correspondences between a plurality of slot offset values between a control channel and a data channel and a plurality of maximum MIMO layer quantities, and one slot offset value of the plurality of slot offset values corresponds to one maximum MIMO layer quantity of the plurality of maximum MIMO layer quantities.

2. The method according to claim 1, wherein the first indication information is carried in downlink control information (DCI).

3. The method according to claim 1, wherein the performing, by the terminal device, wireless communication with the network device based on the first maximum MIMO layer quantity N comprises:
   determining, by the terminal device, a quantity of receive antennas or a quantity of transmit antennas based on the first maximum MIMO layer quantity N and the target minimum slot offset value between the control channel and the data channel.

4. The method according to claim 1, wherein the performing, by the terminal device, wireless communication with the network device based on the first maximum MIMO layer quantity N comprises:
   determining, by the terminal device, a quantity of receive antennas or a quantity of transmit antennas based on the first maximum MIMO layer quantity N and the target slot offset value between the control channel and the data channel.

5. A wireless communication method, comprising:

sending, by a network device, first indication information to a terminal device, wherein the first indication information is used to indicate a first maximum multiple-input multiple-output (MIMO) layer quantity N used by the terminal device to perform wireless communication, and N is an integer greater than or equal to 1; and performing, by the network device, wireless communication with the terminal device based on the first maximum MIMO layer quantity N, wherein:

the first indication information comprises a target minimum slot offset value that is indicated by the network device to be used by the terminal device, and the method further comprises:

determining, by the terminal device based on a first mapping relationship, a maximum MIMO layer quantity corresponding to the target minimum slot offset value as the first maximum MIMO layer quantity N, wherein the first mapping relationship indicates correspondences between a plurality of minimum slot offset values between a control channel and a data channel and a plurality of maximum MIMO layer quantities, and one minimum slot offset value of the plurality of minimum slot offset values corresponds to one maximum MIMO layer quantity of the plurality of maximum MIMO layer quantities; or the first indication information comprises a target slot offset value that is indicated by the network device to be used by the terminal device, and the method further comprises:

determining, by the terminal device based on a second mapping relationship, a maximum MIMO layer quantity corresponding to the target slot offset value as the first maximum MIMO layer quantity N, wherein the second mapping relationship indicates correspondences between a plurality of slot offset values between a control channel and a data channel and a plurality of maximum MIMO layer quantities, and one slot offset value of the plurality of slot offset values corresponds to one maximum MIMO layer quantity of the plurality of maximum MIMO layer quantities.

6. The method according to claim 5, wherein the first indication information is carried in downlink control information (DCI).

7. A terminal device, comprising:
at least one processor; and
a memory storing programming instructions for execution by the at least one processor, the programming instructions instructing a network device to perform operations comprising:

receiving first indication information from the network device, wherein the first indication information is used to indicate a first maximum multiple-input multiple-output (MIMO) layer quantity N used by the terminal device to perform wireless communication, and N is an integer greater than or equal to 1; and performing wireless communication with the network device based on the first maximum MIMO layer quantity N, wherein:

the first indication information comprises a target minimum slot offset value that is indicated by the network device to be used by the terminal device, and the method further comprises:

determining, by the terminal device based on a first mapping relationship, a maximum MIMO layer quantity corresponding to the target minimum slot offset value as the first maximum MIMO layer quantity N, wherein the first mapping relationship indicates correspondences between a plurality of minimum slot offset values between a control channel and a data channel and a plurality of maximum MIMO layer quantities, and one minimum slot offset value of the plurality of minimum slot offset values corresponds to one maximum MIMO layer quantity of the plurality of maximum MIMO layer quantities; or the first indication information comprises a target slot offset value that is indicated by the network device to be used by the terminal device, and the method further comprises:

determining, by the terminal device based on a second mapping relationship, a maximum MIMO layer quantity corresponding to the target slot offset value as the first maximum MIMO layer quantity N, wherein the second mapping relationship indicates correspondences between a plurality of slot offset values between a control channel and a data channel and a plurality of maximum MIMO layer quantities, and one slot offset value of the plurality of slot offset values corresponds to one maximum MIMO layer quantity of the plurality of maximum MIMO layer quantities.

8. The terminal device according to claim 7, wherein the first indication information is carried in downlink control information (DCI).

9. The terminal device according to claim 7, wherein the operations further comprise:

determining, based on information about a first mapping relationship, a maximum MIMO layer quantity corresponding to the target minimum slot offset value as the first maximum MIMO layer quantity N, wherein the first mapping relationship indicates correspondences between a plurality of minimum slot offset values between a control channel and a data channel and a plurality of maximum MIMO layer quantities, and one minimum slot offset value of the plurality of minimum slot offset values corresponds to one maximum MIMO layer quantity of the plurality of maximum MIMO layer quantities.

10. The terminal device according to claim 7, wherein the operations further comprise:

determining, based on information about a second mapping relationship, a maximum MIMO layer quantity corresponding to the target slot offset value as the first maximum MIMO layer quantity N, wherein the second mapping relationship indicates correspondences between a plurality of slot offset values between a control channel and a data channel and a plurality of maximum MIMO layer quantities, and one slot offset value of the plurality of slot offset values corresponds to one maximum MIMO layer quantity of the plurality of maximum MIMO layer quantities.

11. The terminal device according to claim 7, wherein the operations further comprise:

determining, a quantity of receive antennas or a quantity of transmit antennas based on the first maximum MIMO layer quantity N and the target minimum slot offset value between a control channel and a data channel.

12. The terminal device according to claim 7, wherein the operations further comprise:
determining, a quantity of receive antennas or a quantity of transmit antennas based on the first maximum MIMO layer quantity N and the target slot offset value between a control channel and a data channel.

13. A network device, comprising:
at least one processor; and
a memory storing programming instructions for execution by the at least one processor, the programming instructions instructing the network device to perform operations comprising:
sending first indication information to a terminal device, wherein the first indication information is used to indicate a first maximum multiple-input multiple-output (MIMO) layer quantity N to be used by the terminal device to perform wireless communication, and N is an integer greater than or equal to 1; and
performing wireless communication with the terminal device based on the first maximum MIMO layer quantity N, wherein:
the first indication information comprises a target minimum slot offset value that is indicated by the network device to be used by the terminal device, and the method further comprises:
determining, by the terminal device based on a first mapping relationship, a maximum MIMO layer quantity corresponding to the target minimum slot offset value as the first maximum MIMO layer quantity N, wherein the first mapping relationship indicates correspondences between a plurality of minimum slot offset values between a control channel and a data channel and a plurality of maximum MIMO layer quantities, and one minimum slot offset value of the plurality of minimum slot offset values corresponds to one maximum MIMO layer quantity of the plurality of maximum MIMO layer quantities; or the first indication information comprises a target slot offset value that is indicated by the network device to be used by the terminal device, and the method further comprises:
determining, by the terminal device based on a second mapping relationship, a maximum MIMO layer quantity corresponding to the target slot offset value as the first maximum MIMO layer quantity N, wherein the second mapping relationship indicates correspondences between a plurality of slot offset values between a control channel and a data channel and a plurality of maximum MIMO layer quantities, and one slot offset value of the plurality of slot offset values corresponds to one maximum MIMO layer quantity of the plurality of maximum MIMO layer quantities.

14. The network device according to claim 13, wherein the first indication information is carried in downlink control information (DCI).

* * * * *